US 8,939,861 B2

(12) United States Patent
Ishino et al.

(10) Patent No.: US 8,939,861 B2
(45) Date of Patent: Jan. 27, 2015

(54) TRANSAXLE

(71) Applicants: Fumitoshi Ishino, Hyogo (JP); Etsuo Miyake, Hyogo (JP); Takashi Nishizawa, Hyogo (JP)

(72) Inventors: Fumitoshi Ishino, Hyogo (JP); Etsuo Miyake, Hyogo (JP); Takashi Nishizawa, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 296 days.

(21) Appl. No.: 13/648,909

(22) Filed: Oct. 10, 2012

(65) Prior Publication Data

US 2013/0090205 A1    Apr. 11, 2013

(30) Foreign Application Priority Data

Oct. 11, 2011  (JP) ................................ 2011-224152
Oct. 20, 2011  (JP) ................................ 2011-230872

(51) Int. Cl.
*F16H 15/10*  (2006.01)
*B60K 17/16*  (2006.01)
*B60K 17/04*  (2006.01)

(52) U.S. Cl.
CPC .............. *B60K 17/16* (2013.01); *B60K 17/046* (2013.01)
USPC .................. 475/214; 476/24; 476/56; 476/69

(58) Field of Classification Search
USPC ................................. 475/214; 476/24, 56, 69
See application file for complete search history.

(56) References Cited

U.S. PATENT DOCUMENTS

| | | | | | |
|---|---|---|---|---|---|
| 661,409 | A | * | 11/1900 | Lewis ............................ | 476/19 |
| 1,081,954 | A | * | 12/1913 | Green .......................... | 475/217 |
| 1,125,132 | A | * | 1/1915 | Lambert ........................ | 476/19 |
| 1,633,316 | A | * | 6/1927 | Davis ............................ | 476/24 |
| 2,183,434 | A | * | 12/1939 | Smith ............................ | 476/24 |
| 3,678,770 | A | * | 7/1972 | Enters et al. ................... | 476/24 |
| 5,195,933 | A | * | 3/1993 | Thoma et al. ................. | 475/206 |

FOREIGN PATENT DOCUMENTS

JP        2004-036836 A     2/2004

* cited by examiner

*Primary Examiner* — Derek D Knight
(74) *Attorney, Agent, or Firm* — Sterne, Kessler, Goldstein & Fox P.L.L.C.

(57) ABSTRACT

A transaxle comprises a transmission differential unit including a frictional transmission mechanism and a differential mechanism. The frictional transmission mechanism includes an input shaft, a drive disc provided on the input shaft, and a driven disc whose outer peripheral edge frictionally contacts a disc surface of the drive disc. The differential mechanism includes a pair of coaxial output shafts, and a differential casing differentially connecting the output shafts to each other. The driven disc is ring-shaped and is fitted at an inner peripheral portion thereof on an outer peripheral portion of the differential casing so as to be unrotatable relative to the differential casing and so as to be slidable on the outer peripheral portion of the differential casing in the axial direction of the output shafts.

9 Claims, 15 Drawing Sheets (a)

(b)

(a)

(b)

(c)

TRANSAXLE

BACKGROUND OF THE INVENTION

1. Field of the Invention

The present invention relates to a transaxle including a frictional transmission mechanism and a differential mechanism.

2. Related Art

As disclosed by JP 2004-36836 A (hereinafter, "Reference 1"), there is a well-known conventional frictional transmission unit. This frictional transmission unit includes an input shaft to be drivingly connected to a power source, a frictional drive disc fixed on the input shaft, an output shaft extended perpendicular to the input shaft, and a frictional driven disc fitted on the output shaft so as to be unrotatable relative to the output shaft and so as to be axially slidable along the output shaft. A peripheral edge of the driven disc frictionally contacts any portion of a disc surface of the drive disc. The driven disc is slid along the output shaft so as to change the contact position of the driven disc with the drive disc, i.e., the position of the driven disc relative to the drive disc, thereby changing the rotational direction and speed of the output shaft.

Reference 1 also discloses some lawn mowers each of which serves as a working vehicle equipped with a transaxle that includes the frictional transmission unit. Hereinafter, each of the lawn mowers is simply referred to as a "vehicle". The input shaft of the frictional transmission unit serves as an input shaft of the transaxle to be drivingly connected to an engine equipped on the vehicle. The transaxle also includes a differential unit differentially connecting right and left output shafts of the transaxles that are drivingly connected to respective right and left axles of drive wheels. The output shaft of the frictional transmission is drivingly connected to an input portion of the differential unit via a reduction gear train. Therefore, power of the engine is transmitted to the right and left axles via the transaxle while the rotational direction and speed of the output shaft is changed by the slide of the driven disc along the output shaft of the frictional transmission unit so as to change the rotational direction and speed of the right and left axles.

In the embodiment disclosed by Reference 1, the frictional transmission unit and the differential unit are essentially independent of each other. To drivingly connect the frictional transmission unit to the differential unit, the reduction gear train, including a counter shaft and counter gears, must be interposed between the frictional transmission unit and the differential unit, thereby increasing parts and costs.

Further, the transaxle must be expanded because the transaxle must incorporate the frictional transmission unit, the reduction gear train and the differential unit, must ensure the arrangement of the friction drive and driven discs contacting each other in a perpendicular manner and must ensure the slidable range of the driven disc in parallel to the right and left axles.

SUMMARY OF THE INVENTION

An object of the invention is to provide a compact transaxle including a frictional transmission mechanism and a differential mechanism.

To achieve the object, a transaxle according to the invention comprises a transmission differential unit. The transmission differential unit includes a frictional transmission mechanism and a differential mechanism. The frictional transmission mechanism includes an input shaft, a drive disc provided on the input shaft, and a driven disc whose outer peripheral edge frictionally contacts a disc surface of the drive disc. The differential mechanism includes a pair of coaxial output shafts and a differential casing differentially connecting the output shafts to each other. The driven disc is ring-shaped and is fitted at an inner peripheral portion thereof on an outer peripheral portion of the differential casing so as to be unrotatable relative to the differential casing and so as to be slidable on the outer peripheral portion of the differential casing in the axial direction of the output shafts. Therefore, the driven disc serving as the output member of the frictional transmission mechanism and the differential casing serving as the input member of the differential mechanism, are drivingly connected to each other with no transmission member or part interposed therebetween. In other words, the space around the differential casing is used to ensure the slidable range of the driven disc while the differential casing fitted to the driven disc unrotatably relative to the driven disc ensures its driving connection to the driven disc so as to serve as an output member of the frictional transmission mechanism. Whereby the transmission differential unit is advantageously compact so as to reduce the size, weight, parts and costs of the transaxle.

Preferably, the transaxle includes a pair of axles and a pair of reduction mechanisms interposed between the respective output shafts and the respective axles. Therefore, while no speed-reduction member or part is interposed between the frictional transmission mechanism and the differential mechanism, the pair of reduction mechanisms interposed between the respective coaxial output shafts and the axles ensure the required speed-reduction effect of the transaxle, thereby ensuring the compactness of the transmission differential unit.

Preferably, the axles are disposed coaxially to the respective output shafts. Therefore, a space in a vehicle for placing the transaxle is minimized in radial directions with respect to the axles.

Alternatively, preferably, the axles are disposed eccentrically to the respective output shafts. Therefore, a gap between the output shaft and the axle eccentric to the output shaft can be used to ensure a space for arranging the reduction mechanism, thereby enhancing variation of the adaptable reduction mechanism.

Preferably, the transaxle includes a single housing incorporating the transmission differential unit and the reduction mechanisms. Therefore, the number of parts for assembling the transmission differential unit and the reduction mechanisms is reduced so as to reduce cost of the transaxle. Further, the transaxle needs no pipe for supplying lubricant between the transmission differential unit and the reduction mechanisms, which might be needed if housings of the reduction mechanisms were separated from a housing of the transmission differential unit.

Alternatively, preferably, the transaxle includes a first casing incorporating the transmission differential unit, and includes a pair of second casings incorporating the respective reduction mechanisms. Therefore, the variation of arrangement of the reduction mechanisms relative to the transmission differential unit can be enhanced so as to enhance the design variation of the transaxle.

Preferably, the drive disc is provided at a rotary central portion thereof with a region where the peripheral edge of the driven disc does not contact the disc surface of the drive disc. Therefore, when the driven disc passes the rotary central portion of the drive disc so as to change its rotary direction, the driven disc must be located in the region so as to surely realize a neutral state where the differential mechanism does not receive power from the frictional transmission mechanism. In other words, the region of the drive disc serves as a clutch for setting the output shafts in a neutral state when their rotary direction is changed. Therefore, the transaxle needs no additional clutch. Further, the passing of the peripheral edge of the driven disc through the region is necessary when the driven disc moves through the rotary central portion of the drive disc to change its rotary direction, and the speed of the driven disc is necessarily reduced before the peripheral edge of the driven disc reaches the region, thereby reducing shock and improving facility for setting the output shafts into the neutral state when the rotary direction of the output shafts is changed.

These, further and other objects, features and advantages will appear more fully in the following description with reference to drawings.

BRIEF DESCRIPTION OF THE DRAWINGS

FIG. 9(a) shows a clutch-on state of transaxle 200; and FIG. 9(b) shows a clutch-off state of transaxle 200.

FIG. 14(a) shows clutch portion 96b disposed at a neutral position 120; FIG. 14(b) shows clutch portion 96b disposed at a position 125 where clutch portion 96b starts engaging with normal driven disc 94; FIG. 14(c) shows clutch portion 96b disposed at a position 126 in the middle of engagement of clutch portion 96b with normal driven disc 94; and FIG. 14(d) shows clutch portion 96b disposed at a position 127 where a detent ball 188a is engaged into detent recess 94i so as to complete engagement of clutch portion 96b with normal driven disc 94.

FIG. 15(a) shows normal driven disc 94 at a maximum forward traveling speed position 123 while detent ball 188a is engaged in detent recess 94i; FIG. 15(b) shows normal driven disc 94 at an intermediate position 124 between maximum forward traveling speed position 123 and minimum forward traveling speed position 122 while detent ball 188a starts being released from detent recess 94i; and FIG. 15(c) shows normal driven disc 94 reaching minimum forward traveling speed position 122 while detent ball 188a is completely released from detent recess 94i and clutch portion 96b moves to disengage from normal driven disc 94.

DETAILED DESCRIPTION OF THE INVENTION

Figure 1:
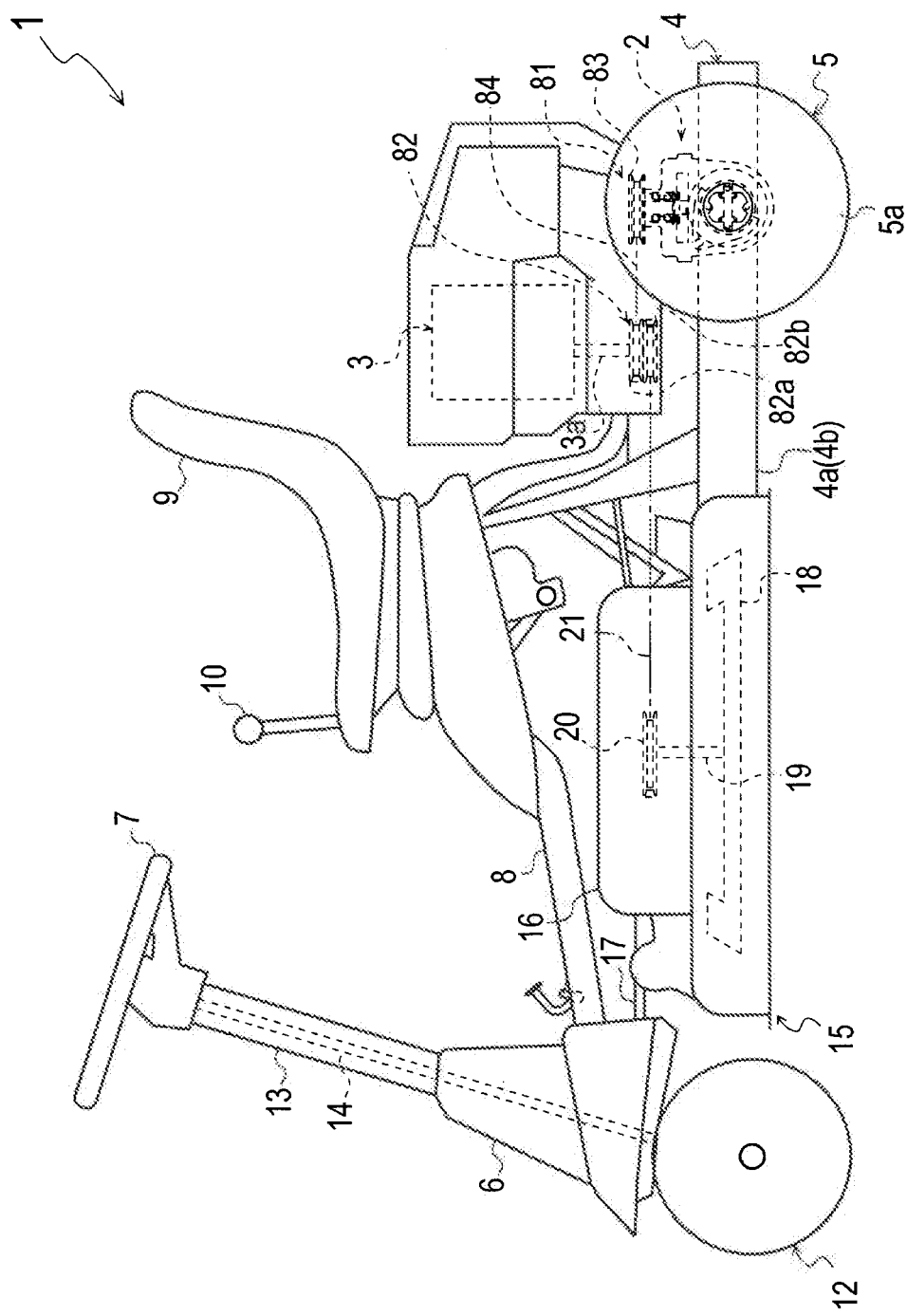
FIG. 1 is a side view of a lawn mower 1 serving as a working vehicle equipped with a transaxle 2.
Figure 2:
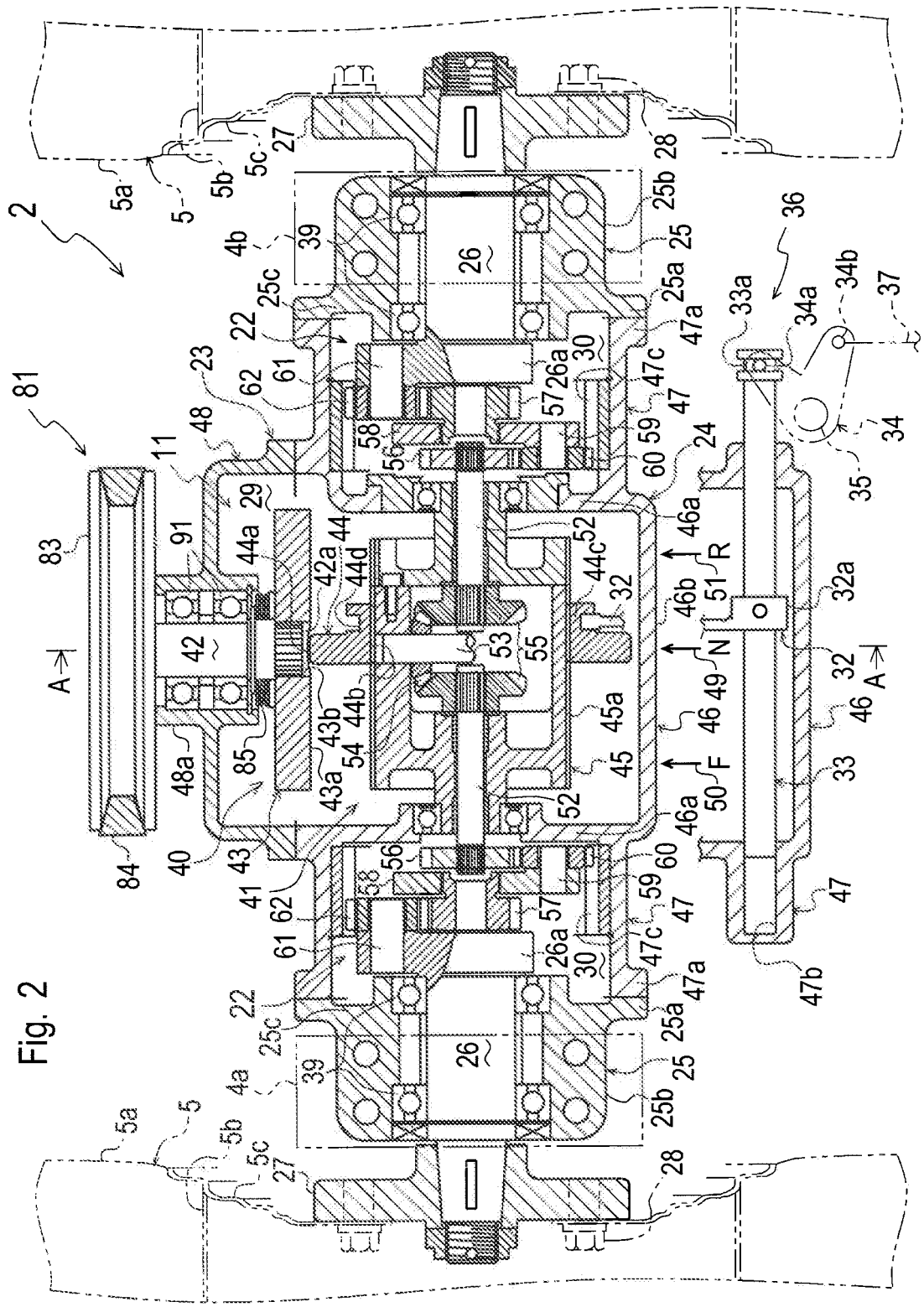
FIG. 2 is a sectional rear view of transaxle 2 with a developed sectional view of a speed control operation mechanism 36.

Referring to FIGS. 1 and 2, a lawn mower 1 will be described. Words "proximal" and "distal" are used in all embodiments of transaxles on an assumption that a "proximal" member or portion is closer to a lateral middle point of the transaxle than a "distal" member or portion.

Lawn mower 1 includes a vehicle body frame 4 that is formed in a rectangular shape when viewed in plan so as to have right and left vertical side plates 4a and 4b. Right and left drive wheels serve as rear wheels 5 each of which is disposed laterally outward of a rear portion of each of right and left side plates 4a and 4b. A transaxle 2 is supported by right and left side plates 4a and 4b and is disposed between right and left rear wheels 5 so as to drive rear wheels 5.

A steering base 6 is mounted upward on a front end portion of vehicle body frame 4, and a steering column 13 is extended upward from steering base 6. A steering wheel 7 serving as a steering manipulator is disposed on a top of steering column 13. A platform 8 is spread over a front portion of vehicle body frame 4 rearward of steering base 6. An engine 3 is mounted upward on a rear portion of vehicle body frame 4. A driver's seat 9 is mounted upward on a fore-and-aft middle portion of vehicle body frame 4 between platform 8 and engine 3.

Transaxle 2 is disposed downward of a rear portion of engine 3. A speed control lever 10 serving as a speed control operation manipulator is disposed adjacent to seat 9. Transaxle 2 includes a speed control operation mechanism 36 that is operatively connected to speed control lever 10 via a linkage including a cable or wire 37. Speed control operation mechanism 36 is operated by rotating speed control lever 10 to control the direction and speed of output rotation of a later-discussed transmission differential unit 11 of transaxle 2 for driving right and left rear wheels 5.

Right and left steerable wheels serve as front wheels 12 each of which is disposed laterally outward of a front portion of each of right and left side plates 4a and 4b. A steering shaft 14 serves as a pivot shaft of steering wheel 7 and is extended downward from steering wheel 7 through steering column 13 and is operatively connected to front wheels 12 so that right and left front wheels 12 can be steered for turning lawn mower 1 by rotating steering wheel 7.

A mower unit 15 is disposed between front wheels 12 and rear wheels 5. Mower unit 15 includes a mower deck 16 that is suspended from vehicle body frame 4 via a linkage 17 so that its height is adjustable. At least one blade 18, a vertical blade drive shaft 19 and a driven pulley 20 are disposed in mower deck 16. Blade 18 is fixed on a bottom end of blade drive shaft 19, and driven pulley 20 is fitted on a top end of blade drive shaft 19.

A belt transmission 81 is extended from engine 3 to mower deck 16 and transaxle 2. Belt transmission 81 includes a drive pulley 82b, driven pulley 20 and a belt 21. In this regard, a vertical engine output shaft 3a is extended downward from engine 3 and is provided on a lower portion thereof with a double pulley 82 including upper and lower drive pulleys 82a and 82b. Belt 21 is looped over pulleys 82b and 20 so as to transmit power of engine 3 from engine output shaft 3a to blade drive shaft 19, thereby driving blade 18.

Upper drive pulley 82a is substantially as high as an input pulley 83 of transaxle 2, and a belt 84 is looped over pulleys 82a and 83 so as to transmit power of engine 3 from engine output shaft 3a to transmission differential unit 11 of transaxle 2.

Figure 3:
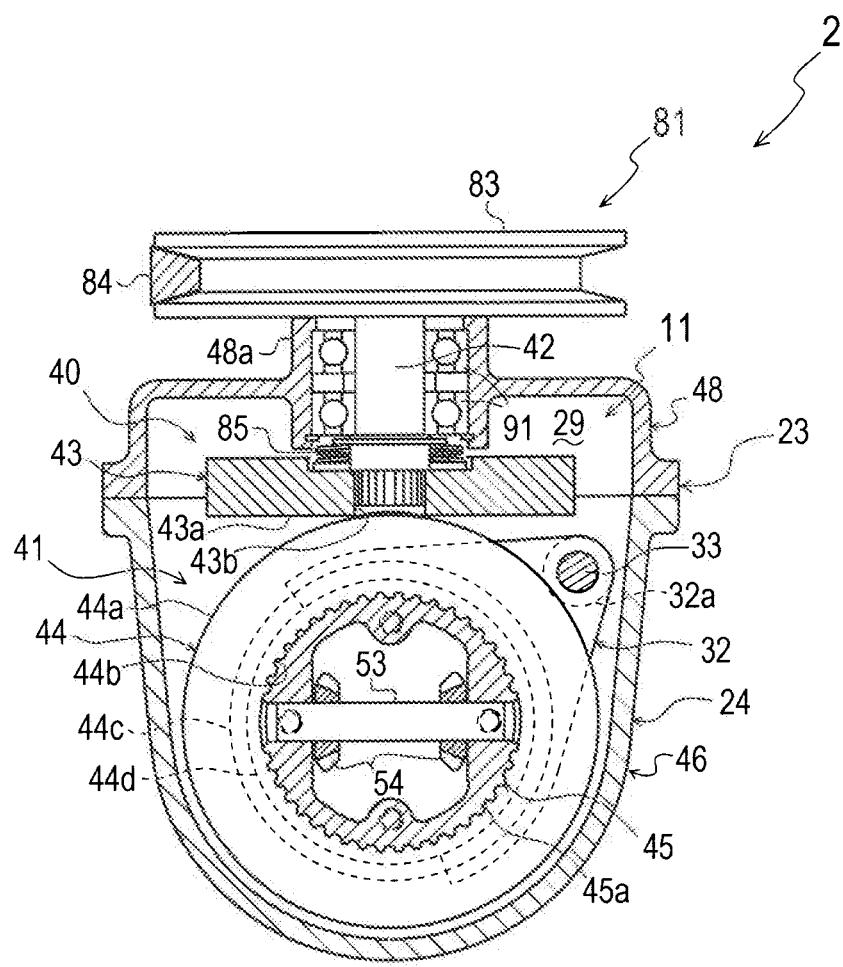
FIG. 3 is a sectional side view of transaxle 2 taken in A-A line of FIG. 2.

Referring to FIGS. 1 to 3, transaxle 2 will be described in detail. Transaxle 2 has right and left coaxial axles 26 extended rightwardly and leftwardly outward. Hubs 27 are fixed on distal ends of respective right and left axles 26. Each of right and left rear wheels 5 has a rim 5b, a tire 5a surrounding rim 5b and a wheel 5c filling a cavity in rim 5b. Each hub 27 is fastened to wheel 5c by bolts 28 so as to fix each axle 26 to each rear wheel 5.

Transaxle 2 includes a transaxle casing 23. Transaxle casing 23 includes a central housing 24, right and left axle housings 25 and a disc cover 48. Central housing 24 includes right and left end openings covered with respective axle housings 25 and includes a top end opening covered with disc cover 48.

Central housing 24 is formed to have right and left small diameter portions 47 and a large diameter portion 46 between right and left small diameter portions 47. Central housing 24 is formed therein with right and left partition walls 46a each of which is disposed between large diameter portion 46 and each small diameter portion 47. Each axle 26 is journalled by each axle housing 25 via bearings 39 and projects outward from an axially distal end of axle housing 25. Each axle housing 25 has an axially proximal end portion 25c and is formed on proximal end portion 25c with a flange 25a. Central housing 24 is formed with flanges 47a on respective right and left distal ends of respective right and left small diameter portions 47. Flanges 25a of respective right and left axle housings 25 are fastened to respective right and left flanges 47a of central housing 24 by bolts (not shown).

Right and left small diameter portions 47 of central housing 24 define respective right and left second chambers 30 therein. Each second chamber 30 is defined at right and left ends thereof by proximal end portion 25c of each axle housing 25 and each partition wall 46a. Each second chamber 30 incorporates a multiple planetary gear mechanism serving as a reduction mechanism 22.

Large diameter portion 46 defines a first chamber 29 therein. First chamber 29 is defined at right and left ends thereof by right and left partition walls 46a and is defined at a top end thereof by disc cover 48. First chamber 29 incorporates transmission differential unit 11.

Each axle housing 25 has a main body 25b axially extended between the axially distal end of axle housing 25 and flange 25a on proximal end portion 25c so as to surround axle 26. Right and left side plates 4a and 4b of vehicle body frame 4 are formed with respective holes. Main bodies 25b of respective axle housings 25 are inserted into the holes of respective right and left side plates 4a and 4b from an inside space between right and left side plates 4a and 4b so as to be fastened to respective right and left side plates 4a and 4b by bolts or the like, thereby fixing transaxle casing 23 to vehicle body frame 4.

Transmission differential unit 11 will be described in detail. Transmission differential unit 11 includes a friction transmission mechanism 40 and a differential mechanism 41. Friction transmission mechanism 40 includes an input shaft 42, a horizontal friction drive disc 43 and a vertical friction driven disc 44. Input pulley 83 is fixed on a top end portion of input shaft 42 so as to receive power from engine 3. Drive disc 43 is vertically slidably spline-fitted on a bottom end portion of input shaft 42. A horizontal lower surface of drive disc 43 serves as a disc surface 43a of drive disc 43, and a peripheral edge of driven disc 44 serves as a disc edge 44a that frictionally contacts disc surface 43a of drive disc 43 at a top end thereof.

Disc cover 48 is formed with a vertical boss 48a that journals input shaft 42 via bearings 91. The top end portion of input shaft 42 projects upward from a top end of boss 48a so as to be fixedly provided thereon with input pulley 83. The bottom end portion of input shaft 42 projects downward from a bottom end of boss 48a so as to be spline-fittingly provided thereon with drive disc 43. A spring 85 is compressed around input shaft 42 between the bottom end surface of boss 48a and a horizontal upper surface of drive disc 43 so as to constantly bias drive disc 43 downward, thereby downwardly pressing horizontal drive disc 43 against vertical driven disc 44 under drive disc 43. This downward pressure of drive disc 43 against driven disc 44 ensures a friction force between disc surface 43a of drive disc 43 and disc edge 44a of driven disc 44 so as to reduce a loss of power transmitted from drive disc 43 to driven disc 44. Hereinafter, a frictional abutting point of disc edge 44a against disc surface 43a is referred to as a friction disc contact point.

A differential casing 45 is formed on an outer peripheral surface thereof with splines 45a, and ring-shaped driven disc 44 has a central boss 44c whose inner peripheral surface thereof is formed with splines 44b so as to correspond to splines 45a. Therefore, driven disc 44 is spline-fitted on differential casing 45 so as to be unrotatable relative to differential casing 45 and so as to be axially slidable along differential casing 45.

Further, central boss 44c of driven disc 44 is axially extended on differential casing 45 so as to be formed thereon with a fork groove 44d. A fork 32 is fitted into fork groove 44d. A boss portion 32a of fork 32 is fixed on a fork shaft 33. Fork 32 and fork shaft 33 constitute speed control operation mechanism 36 for axially moving driven disc 44. As shown in FIG. 2, an axial end portion of fork shaft 33 is fitted into a recess 47b formed on one of small diameter portions 47 of central housing 24. Recess 47b has an axial depth for allowing the axial slide of fork shaft 33. Another axial end portion of fork shaft 33 projects outward from transaxle casing 23 at large diameter portion 46 of central housing 24. An L-shaped bell crank 34 is pivoted on a pivot shaft 35 at a bent portion thereof. An end portion 34a of bell crank 34 is pivoted onto an engagement groove 33a formed on the axial end portion of fork shaft 33 outside of transaxle casing 23. An end of cable 37 is pivoted on to another end portion 34b of bell crank 34. For example, fork shaft 33 is supported by an upper front portion of large diameter portion 46 of central housing 24 as shown in FIG. 3 conveniently for its connection to speed control lever 10 disposed forward of transaxle 2.

Due to the above-mentioned structure of speed control operation mechanism 36, when speed control lever 10 is rotated, cable 37 is pushed or pulled to rotate bell crank 34 centered on pivot shaft 35 so as to axially move fork shall 33 together with fork 32, thereby axially sliding driven disc 44 in first chamber 29 along splines 45a of differential casing 45 so as to change the frictional contact position of driven disc 44 relative to drive disc 43, i.e., the frictional abutting point of disc edge 44a against disc surface 43a.

It is assumed that the friction disc contact point moves on a diameter of disc surface 43a. On this assumption, a rotary axis of disc surface 43a is defined as a position 49 on this diameter of disc surface 43a. When the frictional disc contact point is located at position 49, driven disc 44 does not rotate, whereby differential casing 45 is stationary. This stationary state of differential casing 45 is defined as a neutral state N of differential mechanism 41. In this regard, a bottom end surface 42a of input shaft 42 fitted in a central hole of drive disc 43 is disposed above a level of disc surface 43a in the central hole of drive disc 43 so as to have a space 43b from the top of disc edge 44a defined as the friction disc contact point, thereby separating driven disc 44 from drive disc 43 so as to surely isolate driven disc 44 from the rotation of drive disc 43. In other words, the rotary central portion of drive disc 43 is provided with a region where disc edge 44a of driven disc 44 does not contact disc surface 43a of drive disc 43. Therefore, transaxle 2 does not need a clutch however has only space 43b below bottom end surface 42a of input shaft 42 in the central hole of drive disc 43 for isolating driven disc 44 from the rotary force of drive disc 43 to set differential mechanism 41 in neutral state N.

The diameter of disc surface 43a on which the friction disc contact point moves has opposite ends defined as positions 50 and 51. As the friction disc contact point moves on the diameter of disc surface 43a from position 49 to position 50, the distance of the friction disc contact point from the rotary axis of drive disc 43 on the diameter of drive disc 43 increases so as to increase the peripheral speed of driven disc 44 frictionally contacting disc surface 43a of drive disc 43 at the friction disc contact point. In this way, the rotary speed of differential casing 45 in a direction for forward traveling of lawn mower 1 is steplessly increased. Finally, when the friction disc contact point reaches position 50 on disc surface 43a, the forward traveling rotary speed of differential casing 45 becomes maximum, and this state of differential casing 45 is defined as a maximum forward traveling speed state F of differential mechanism 41.

As the friction disc contact point moves on the diameter of disc surface 43a from position 49 to opposite position 51, the rotary speed of differential casing 45 in a direction for backward traveling of lawn mower 1 is steplessly increased. Finally, when the friction disc contact point reaches position 51 on disc surface 43a, the backward traveling rotary speed of differential casing 45 becomes maximum, and this state of differential casing 45 is defined as a maximum backward traveling speed state R of differential mechanism 41.

Differential mechanism 41 includes right and left coaxial differential yoke shafts 52, differential casing 45, a differential pinion shaft 53, a pair of differential pinions 54 and right and left differential side gears 55. Differential yoke shafts 52 serve as a pair of output shafts of differential mechanism 41 and are differentially connected to each other by differential casing 45. Differential casing 45 is journalled in central housing 24 so as to have proximal end portions of differential yoke shafts 52 therein. Differential pinion shaft 53 is disposed in differential casing 45 between the proximal end portions of differential yoke shafts 52 and perpendicular to differential yoke shafts 52 so as to be rotatably integral with differential casing 45. The pair of differential pinions 54 are symmetrically pivoted on differential pinion shaft 53 in differential casing 45. Right and left differential side gears 55 are fixed on the proximal end portions of respective right and left differential yoke shafts 52, so that each of differential pinions 54 meshes with both right and left differential side gears 55.

As mentioned above, driven disc 44 serving as an output member of frictional transmission mechanism 40 is spline-fitted on differential casing 45 serving as an input member of differential mechanism 41. Since differential casing 45 is rotatably integral with driven disc 44, the output rotary force of driven disc 44 is directly transmitted to differential casing 45 so as to be transmitted to right and left differential yoke shafts 52 via differential pinions 54.

Right and left axles 26 are disposed coaxially to respective right and left differential yoke shafts 52. Each of right and left reduction mechanisms 22 includes a first sun gear 56, a second sun gear 57, a planetary gear carrier 58, at least one first planetary gear 60, at least one second planetary gear 62 and an internal gear 47c. Internal gear 47c is fixed on an inner peripheral surface of each of right and left small diameter portions 47 of central housing 24.

First sun gear 56 is fixed on a distal end portion of each of right and left differential yoke shafts 52. A proximal end portion of each axle 26 projects proximally from proximal end portion 25c of each axle housing 25 toward corresponding differential yoke shaft 52 and is expanded radially so as to be formed as a flange 26a. Second sun gear 57 is disposed between flange 26a and first sun gear 56 coaxially to differential yoke shaft 52 and axle 26 so as to be rotatable relative to differential yoke shaft 52 and axle 26. A central axial portion of second sun gear 57 is extended toward differential yoke shaft 52, and planetary gear carrier 58 is fitted on this central axial portion of second sun gear 57 so as to be unrotatable relative to second sun gear 57.

At least one planetary gear shaft 59 is supported by planetary gear carrier 58 and is extended parallel to differential yoke shaft 52 so as to be provided thereon with at least one first planetary gear 60 that is rotatable relative to planetary gear carrier 58. First planetary gear 60 constantly meshes with first sun gear 56 and internal gear 47c.

At least one planetary gear shaft 61 is supported by flange 26a and is extended parallel to differential yoke shaft 52 so as to be provided thereon with at least one second planetary gear 62 that is rotatable relative to flange 26a. Second planetary gear 62 constantly meshes with second sun gear 57 and internal gear 47c.

Due to the above-mentioned structure of reduction mechanisms 22, as differential yoke shaft 52 rotates, first sun gear 56 rotates together with differential yoke shaft 52 so as to revolve first planetary gear 60 centered on first sun gear 56 and along internal gear 47c, so that planetary gear carrier 58 rotates together with second sun gear 57 according to the revolution of first planetary gear 60 so as to revolve second planetary gear 62 centered on second sun gear 57 and along internal gear 47c, thereby rotating axle 26 according to the revolution of second planetary gear 62.

Transaxle 2 is advantageous in its compactness, especially, in reducing a distance between input shaft 42 and differential yoke shafts 52 (output shafts of transmission differential unit 11) because driven disc 44 spline-fitted on differential casing 45 is disposed coaxially to differential yoke shafts 52.

Reduction mechanisms 22 ensure the required speed-reduction effect of transaxle 2 to axles 26 while no reduction mechanism is interposed between driven disc 44 and differential casing 45. Reduction mechanisms 22 ensure coaxial connection of axles 26 to differential yoke shafts 52, thereby minimizing transaxle 2 radially with respect to differential yoke shafts 52 and axles 26.

Further, single central housing 24 defines both first chamber 29 incorporating transmission differential unit 11 and second chambers 30 incorporating reduction mechanisms 22, thereby reducing the number of parts for assembling transmission differential unit 11 with reduction mechanisms 22 to constitute transaxle 2.

Figure 4:
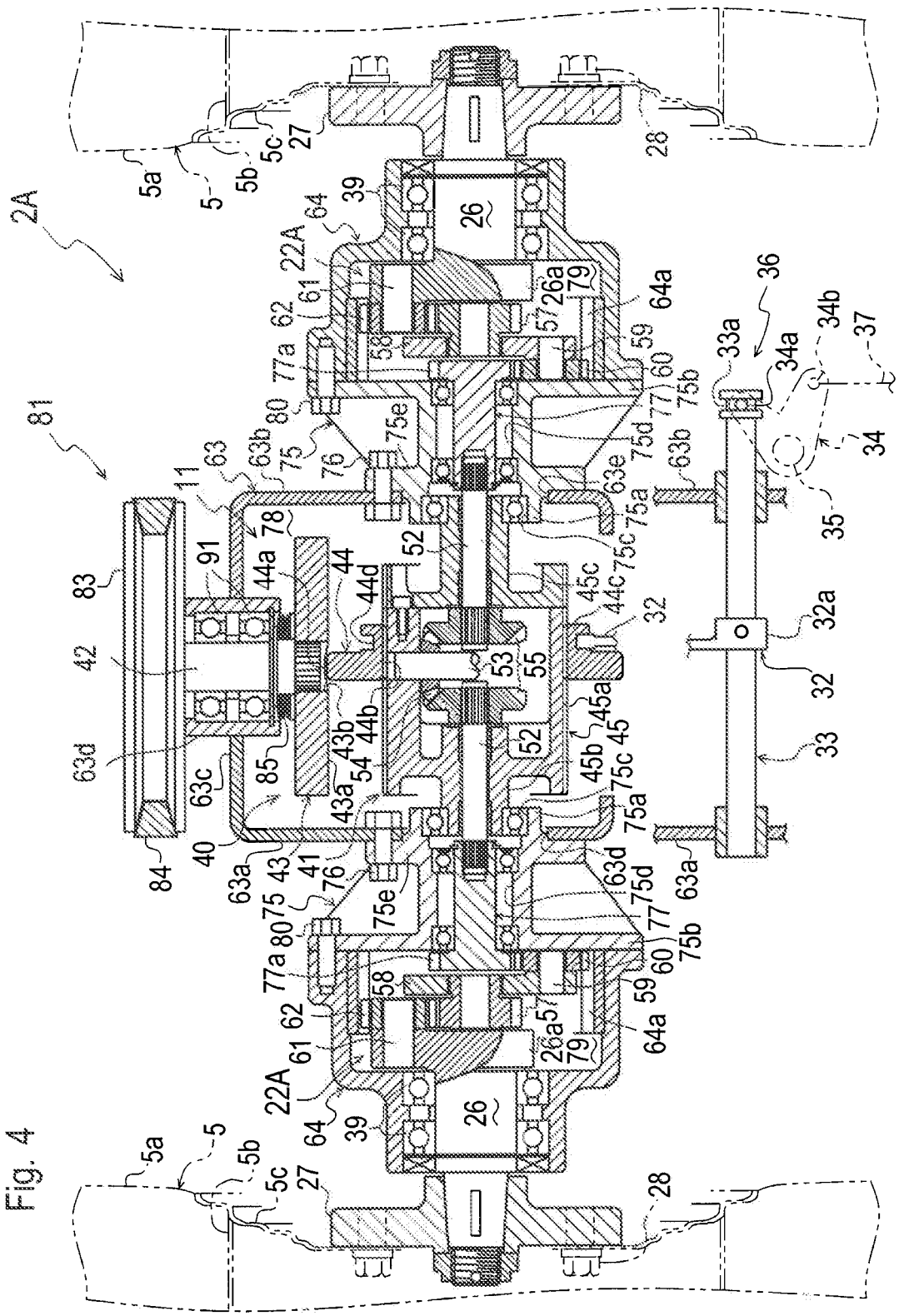
FIG. 4 is a sectional rear view of an alternative transaxle 2A serving as a modification of transaxle 2.

Referring to FIG. 4, an alternative transaxle 2A will be described. The reference numerals used in the embodiment of FIGS. 1 to 3 are used to designate members and parts that have the same functions as those in the embodiment of FIGS. 1 to 3 designated by the same reference numerals.

Transaxle 2A is configured so that reduction mechanisms 22 are easily separable from transmission differential unit 11. In this regard, a vehicle body frame 63 of a vehicle (alternative lawn mower 1) is used to constitute a first casing of transaxle 2A incorporating transmission differential unit 11. Right and left axle casings 64 journaling respective axles 26 via bearings 39 are detachably attached to vehicle body frame 63 so as to serve as second casings that incorporate alternative reduction mechanisms 22A drivingly connected to transmission differential unit 11.

Vehicle body frame 63 is formed in a vertically reversed (downwardly opened) U-shape in a sectional front (rear) view so as to have a horizontal top plate 63c and right and left vertical side plates 63a and 63b and so as to define a first chamber 78 by plates 63a, 63b and 63c. Fork shaft 33 is axially slidably supported by right and left side plates 63a and 63b. Top plate 63c journals vertical input shaft 42. Right and left side plates 63b and 63c have respective holes 63d and 63e. Axially proximal end portions 75a of right and left brackets 75 defining respective holes 75c are inserted into first chamber 78 through respective holes 63d and 63e. Proximal flanges 75e are formed on of respective brackets 75 adjacent to axially proximal end portions 75a and are fitted on distal surfaces of side plates 63a and 63b so as to cover respective holes 63d and 63e and are fastened to side plates 63a and 63b by bolts 76. Each of brackets 75 is extended distally from axially proximal end portion 75a so as to define a horizontal cylindrical hole 75d extended from hole 75c and has a distal flange 75b on a distal end thereof. Each of brackets 75 is formed with ribs that are tapered from distal flange 75b to proximal flange 75e adjacent to proximal end portion 75a.

Right and left connection shafts 77 are passed through cylindrical holes 75d of respective brackets 75 and are journalled by respective brackets 75 via bearings. On the other hand, differential casing 45 is formed with right and left axial side portions 45b and 45c journaling respective differential yoke shafts 52. To attach later-discussed right and left axle casings 64 to vehicle body frame 63, proximal end portions 75a of right and left brackets 75 fixed to respective axle casings 64 are fitted into respective holes 63d and 63e, and axial side portions 45b and 45c of differential casing 45 are fitted into proximal end portions 75a of brackets 75 fitted in holes 63d and 63e via respective bearings so that distal end portions of respective differential yoke shafts 52 are spline-fitted into proximal end portions of respective connection shafts 77, thereby fixing differential yoke shafts 52 to respective connection shafts 77.

Axle casings 64 are fastened at respective proximal end portions thereof to distal flanges 75b of respective brackets 75 by bolts 80. Each axle casing 64 and distal flange 75b of corresponding bracket 75 defines a second chamber 79 incorporating reduction mechanism 22A drivingly connecting connection shaft 77 to axle 26. Axles 26 journalled by axle casings 64 are disposed coaxially to connection shafts 77 and differential yoke shafts 52. In each reduction mechanism 22A, a distal end portion of connection shaft 77 projects from distal flange 75b of bracket 75 into second chamber 79 so as to be formed as a first sun gear 77a similar to first sun gear 56 of reduction mechanism 22. The same second sun gear 57, planetary gear carrier 58, planetary gear shafts 59 and 61, first and second planetary gears 60 and 62 and flange 26a of axle 26 as those of reduction mechanism 22 constitute reduction mechanism 22A. An internal gear 64a is formed or fixed on an inner peripheral surface of axle casing 64 and mesh with planetary gears 60 and 62.

In this way, brackets 75 are interposed between vehicle body frame 63 and respective axle casings 64 so as to interpose connection shafts 77 between differential mechanism 41 of transmission differential unit 11 and respective reduction mechanisms 22A, thereby ensuring the driving connection of transmission differential unit 11 inside of vehicle body frame 63 to right and left drive wheels 5 that are considerably distant from right and left side plates 63a and 63b. Therefore, brackets 75 with connection shafts 77 are advantageous for a vehicle having a long span between right and left drive wheels 5. If the vehicle is designed to have a short span between right and left drive wheels 5, right and left axle casings 64 can be directly connected to vehicle body frame 63 without brackets 75.

Transaxle 2A has the above-mentioned advantageous compactness because of the spline-fitting of driven disc 44 on differential casing 45 and because of the coaxial arrangement of axles 26 to differential yoke shafts 52. Further, transaxle 2A is advantageous in separating axle casings 64 incorporating reduction mechanisms 22A from vehicle body frame 63 serving as the casing incorporating transmission differential unit 11, thereby enhancing design variation of transaxle 2A due to whether or not it has brackets 75 and connection shafts 77, for example.

Figure 5:
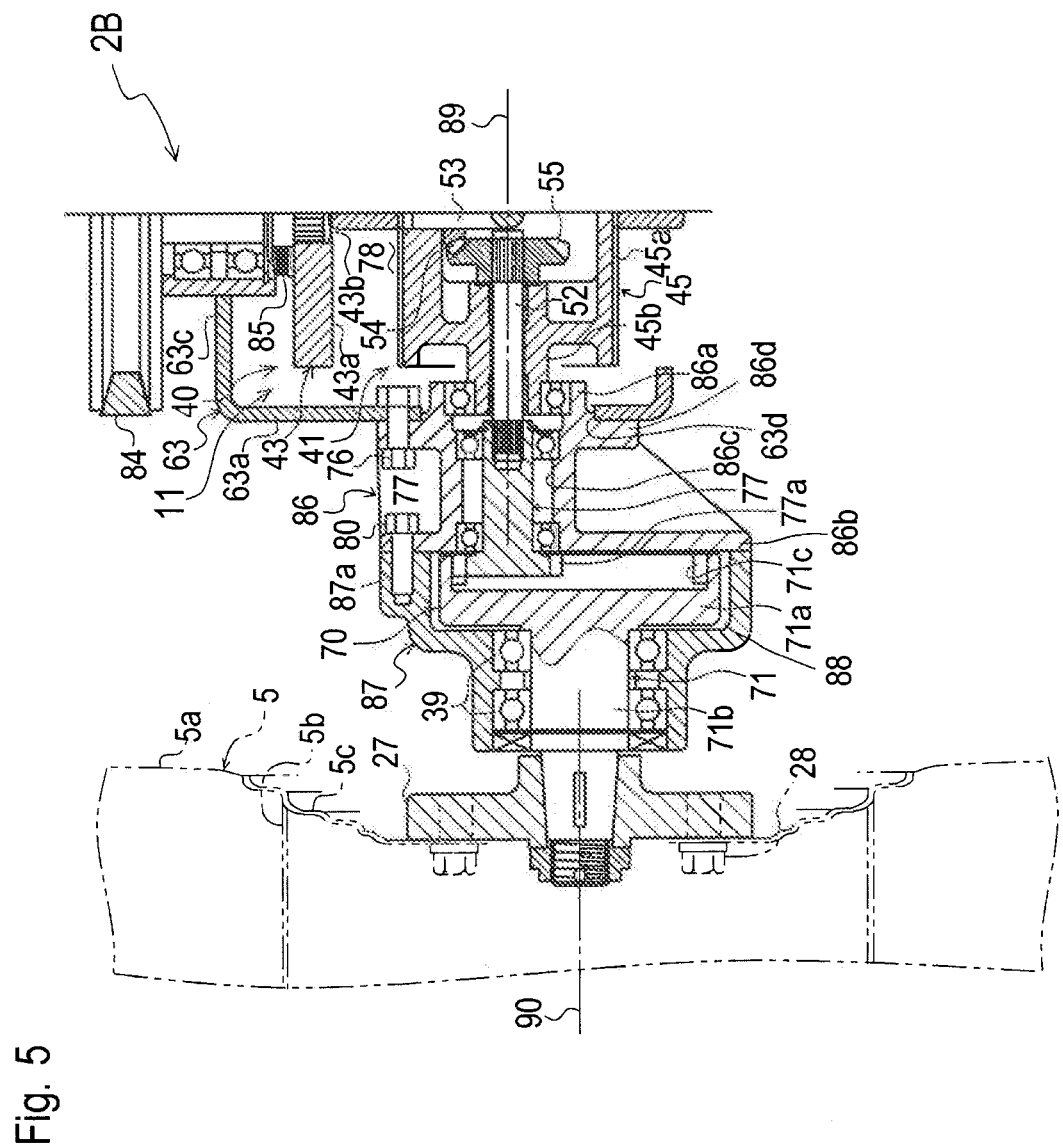
FIG. 5 is a sectional rear view of a representative half part of an alternative transaxle 2B serving as a modification of transaxle 2A.

Referring to FIG. 5, an alternative transaxle 2B will be described. Only one of right and left halves of transaxle 2B is shown in FIG. 5 so as to represent entire transaxle 2B. Transaxle 2B uses vehicle body frame 63 serving as the casing of transmission differential unit 11, similar to transaxle 2A. Transaxle 2B is available to support axles 71 of drive wheels 5 eccentrically to differential yoke shafts 52, i.e., to offset an axial line 90 of axles 71 from an axial line 89 of differential yoke shafts 52 and connection shafts 77 while transaxle 2A is available to support axles 26 of drive wheels 5 coaxially to differential yoke shafts 52.

Right and left brackets 86 journaling respective connection shafts 77 are attached to vehicle body frame 63 so as to locate connection shafts 77 coaxially to differential yoke shafts 52 and so as to fix connection shafts 77 to differential yoke shafts 52, similar to brackets 75 journaling connection shafts 77. In this regard, a proximal end portion 86a of each bracket 86 is fitted into each of right and left holes 63d and 63e of vehicle body frame 63 so as to have each of axial side portions 45b and 45c of differential casing 45 fitted via a bearing, a flange 86d formed on bracket 86 adjacent to proximal end portion 86a is fastened to each of side plates 63a and 63b of vehicle body frame 63 by bolts 76, and connection shaft 77 is journalled in a cylindrical hole 86c of bracket 86 and is fixed to corresponding differential yoke shaft 52 by spline-fitting. The different point of bracket 86 from bracket 75 is that a distal flange 86b of bracket 86 is expanded eccentrically to cylindrical hole 86c while cylindrical hole 75d of bracket 75 is disposed at the center of distal flange 75b.

Axle casings 87 journaling respective axles 71 are fastened to respective brackets 86. In this regard, a proximal end portion of each axle casing 87 is radially expanded so as to be formed as a proximally open cup-shaped portion 87a. Distal flange 86b of each bracket 86 is fastened to the cup-shaped proximal end portion of axle casing 87.

Each axle 71 is journalled at a main axle portion 71b by axle casing 87 via bearings 39. A distal end of axle 71 projects outward from axle casing 87 so as to be fixedly provided thereon with hub 27. A cup-shaped proximal end portion 71a of axle 71 is expanded radially so as to have a cylindrical recess whose inner peripheral surface is formed as an internal gear 71c. This proximal end portion 71a of axle 71 having internal gear 71c is disposed in cup-shaped proximal end portion 87a of axle casing 87. Due to the eccentric expansion of distal flange 86b of bracket 86, pinion 77a formed on the distal end of connection shaft 77 is disposed in the cylindrical recess of proximal end portion 71a of axle 71 eccentrically to main axle portion 71b of axle 71 so as to define the gap between axial lines 89 and 90 and meshes with internal gear 71c. Therefore, pinion 77a and internal gear 71c constitute a reduction mechanism 70 for transmitting the rotary force of differential yoke shaft 52 to corresponding axle 71.

The advantage of transaxle 2B is that reduction mechanism 70 using only two gears 77a and 71c is simple so as to reduce the number of parts and costs. The reduction ratio of reduction mechanism 70 depends on the diameter ratio of internal gear 71c to pinion 77a. This diameter ratio defines the gap of axial line 90 from axial line 89, i.e., the eccentricity of axles 71 to differential yoke shafts 52. Therefore, to increase the reduction ratio, reduction mechanism 70 increases the width perpendicular to the axial direction of axles 71 by radially expanding cup-shaped proximal end portion 71a rather than increases the length in the axial direction of axles 71 by increasing the number of gears, thereby being rather advantageous to minimize axle casing 87 incorporating reduction mechanism 70 in the axial direction of axles 71. On the contrary, to reduce the reduction ratio, reduction mechanism 22A increases the length in the axial direction of axles 26 by increasing the number of gears rather than increases the width perpendicular to the axial direction of axles 26, thereby being rather advantageous to minimize axle casing 64 incorporating reduction mechanism 22A in the axial direction of axles 26.

The position of pinion 77a relative to internal gear 71c may be changed depending on which bolt holes of proximal flange 86d of bracket 86 for bolts 76 coincide to respective bolt holes of axle casing 87 for bolts 80, for example. If transaxle 2B is desired to have differential yoke shafts 52 higher than axles 71, brackets 86 are fastened to vehicle body frame 63 by bolts 76 while axial line 90 of axles 71 is located below axial line 89 of differential yoke shafts 52 and connection shafts 77. If the gap between axial lines 89 and 90 is not desired to define a height difference between axles 71 and differential yoke shafts 52, brackets 86 with axle casings 87 may be fastened to vehicle body frame 63 by bolts 76 so as to offset axles 71 forward or rearward from differential yoke shafts 52.

Further, axle casings 87 may be directly fastened to vehicle body frame 63 without brackets 86. In this case, the distal end portion of each differential yoke shaft 52 may be disposed in the cylindrical recess of proximal end portion 71a of axle 71 and a pinion may be fixed on the distal end portion of differential yoke shaft 52 so as to mesh with internal gear 71c.

Figure 6:
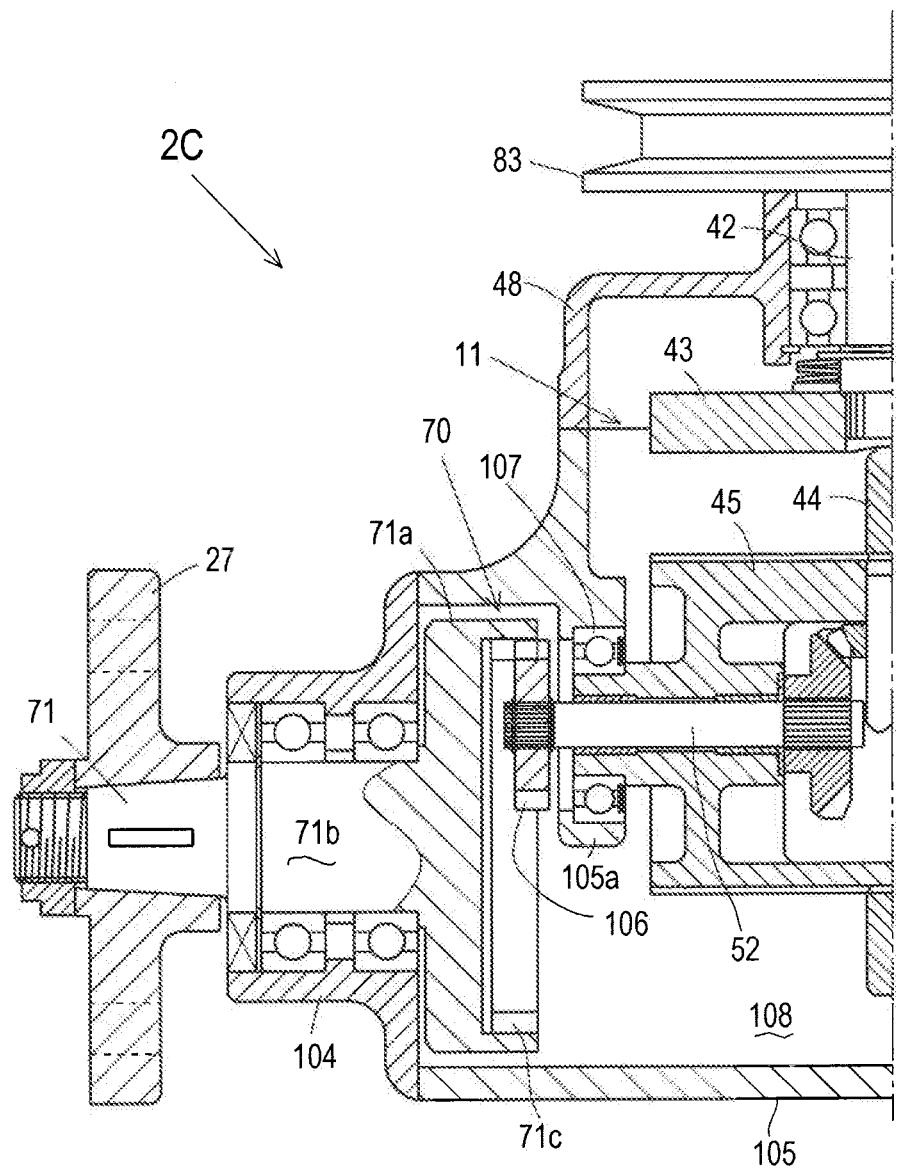
FIG. 6 is a sectional rear view of a representative half part of an alternative transaxle 2C serving as a modification of transaxle 2B.

FIG. 6 shows a representative half part of an alternative transaxle 2C serving as a modification of transaxle 2B. Transaxle 2C includes transmission differential unit 11, right and left axles 71 eccentric to differential yoke shafts 52 of transmission differential unit 11, and right and left reduction mechanisms 70 interposed between respective differential yoke shafts 52 and respective axles 71, similar to transaxle 2B. A different point of transaxle 2C from transaxle 2B is that transaxle 2C includes a housing 105 defining a chamber 108 which incorporates transmission differential unit 11 and right and left reduction mechanisms 70. Housing 105 is formed in chamber 108 with right and left bearing walls 105a. Right and left bearing walls 105a journal respective differential yoke shafts 52 via respective bearings 107. Therefore, single housing 105 incorporates transmission differential unit 11 and reduction mechanisms 70, thereby reducing the number of parts for housing these unit and mechanisms.

Disc cover 48 is attached to the top of housing 105 similar to disc cover 48 attached to the top of central housing 24 in transaxle 2. To ensure convenience for access to transmission differential unit 11 and reduction mechanisms 70 in housing 105, for example, housing 105 may be open at a front, rear or bottom end thereof so as to enable first and second chambers 108 and 109 to open outward, and a cover may be attached to housing 105 for covering the front or rear open end of housing 105. Alternatively or additionally, as shown in FIG. 6, housing 105 may be open at right and left ends thereof, and right and left axle housings 104 may be fixed to the respective right and left ends of housing 105 so as to cover the right and left end openings of housing 105.

In the embodiment shown in FIG. 6, right and left axles 71 are journalled by right and left axle housing 104 via bearings. Distal end portions of axles 71 project outward from distal ends of right and left axle housing 104 so as to be fixedly provided thereon with respective hubs 27. Proximal end portions 71a of axles 71 project from proximal ends of respective axle housings 104 into chamber 108 of housing 105 and are formed with internal gears 71c of reduction mechanisms 70 in chamber 108 of housing 105. Another different point of transaxle 2C from transaxle 2B is that a pinion 106 is directly fixed on a distal end of each differential yoke shaft 52 and meshes with corresponding internal gear 71c so as to constitute each reduction mechanism 70. Alternatively, a connection shaft may be interposed between a pinion of reduction mechanism 70 and differential yoke shaft 52 so as to correspond to a vehicle having a long span between right and left drive wheels. In this case, another housing designed to be laterally longer than housing 105 is provided to incorporate transmission differential unit 11, right and left reduction mechanisms 70 and the right and left connection shafts.

Figure 7:
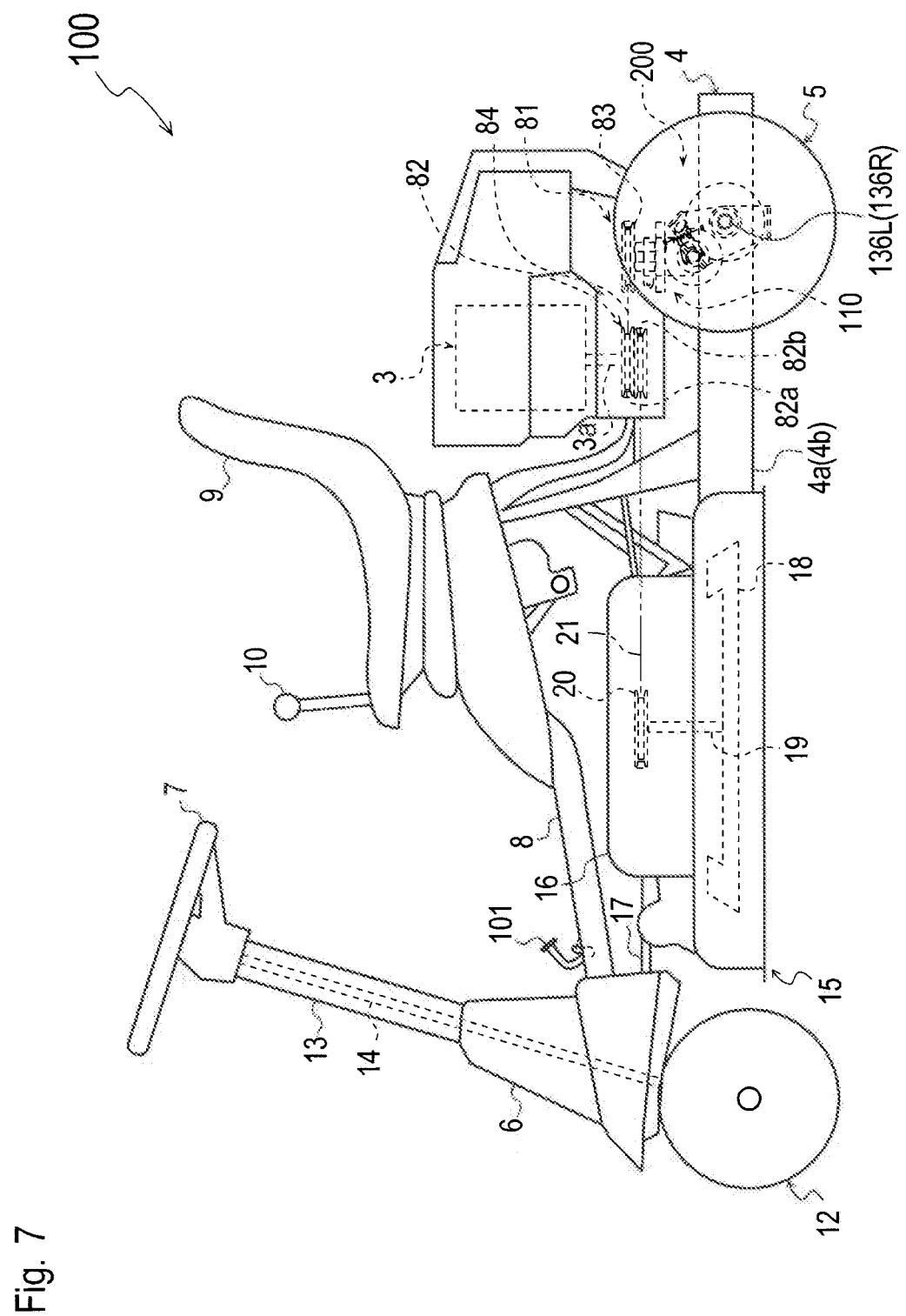
FIG. 7 is a side view of an alternative lawn mower 100 serving as a working vehicle equipped with an alternative transaxle 200.

FIG. 7 shows an alternative lawn mower 100 that is identical to lawn mower 1 excluding that it is equipped with an alternative transaxle 200 for driving rear wheels 5. A pedal disposed adjacent to steering base 6 is defined as a clutch pedal 101 which is depressed to disengage a later-discussed clutch 110 of transaxle 200.

Figure 8:
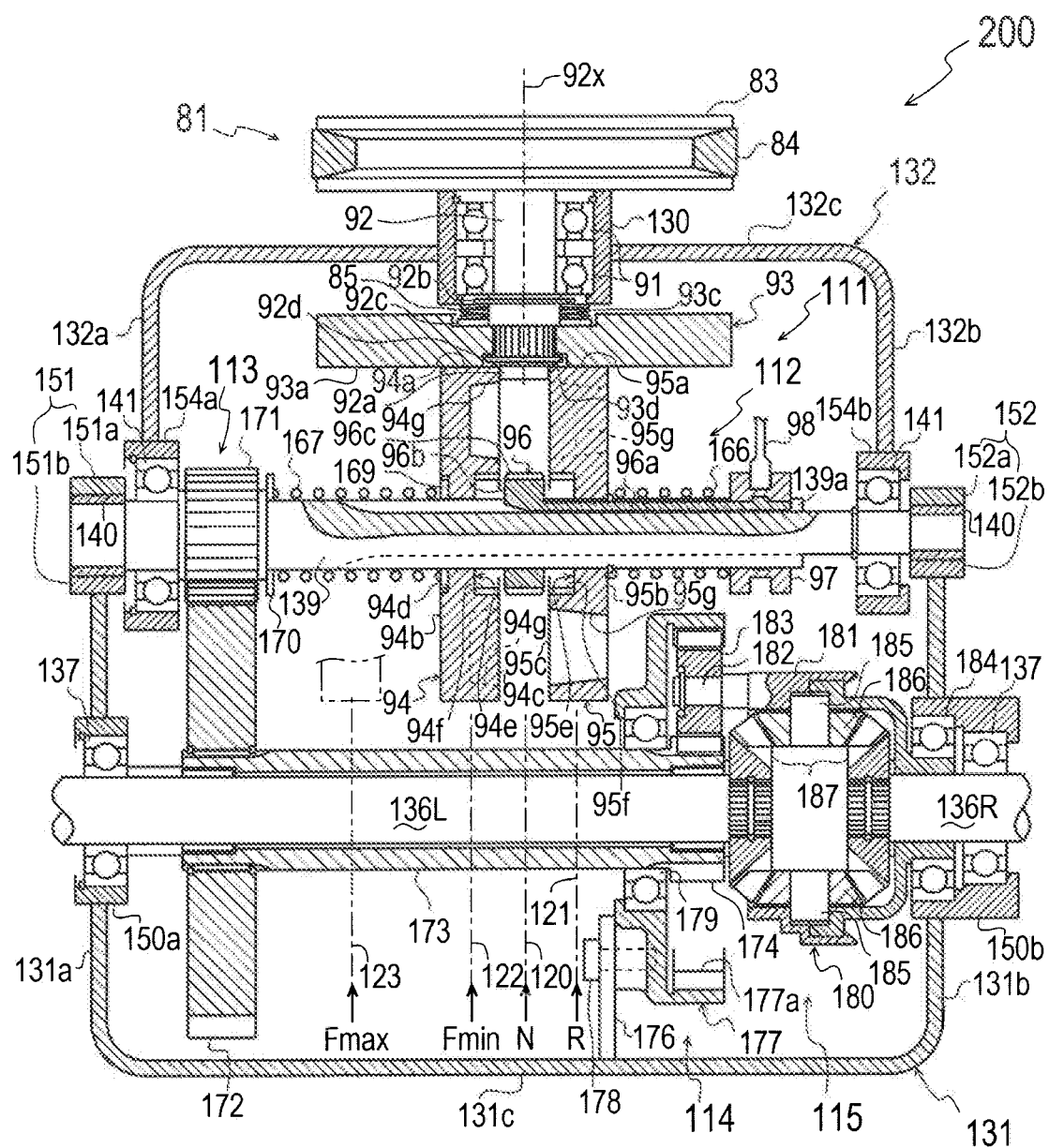
FIG. 8 is a sectional rear view of transaxle 200.
Figure 9:
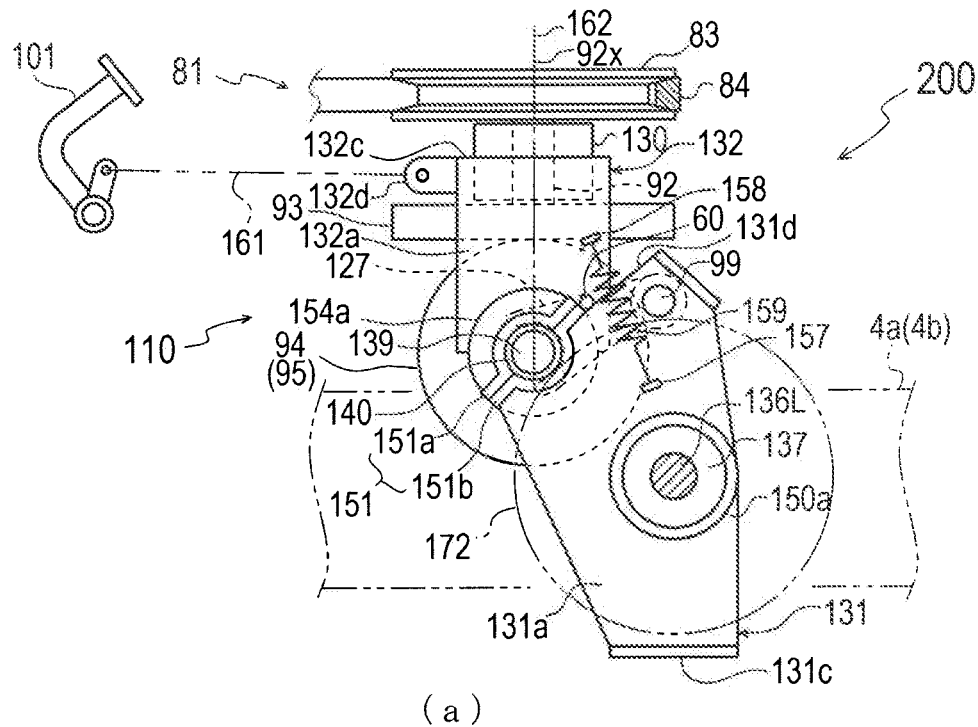
FIGS. 9(a) and 9(b) are side views of transaxle 200.
Figure 9:
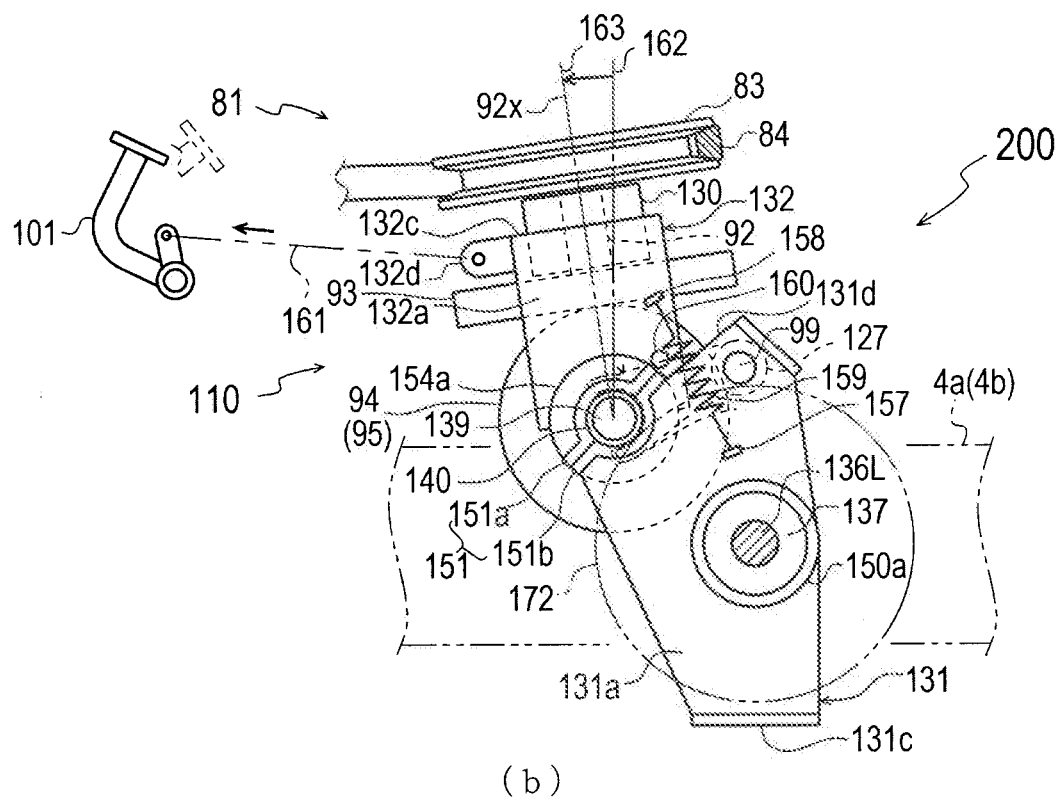
Figure 10:
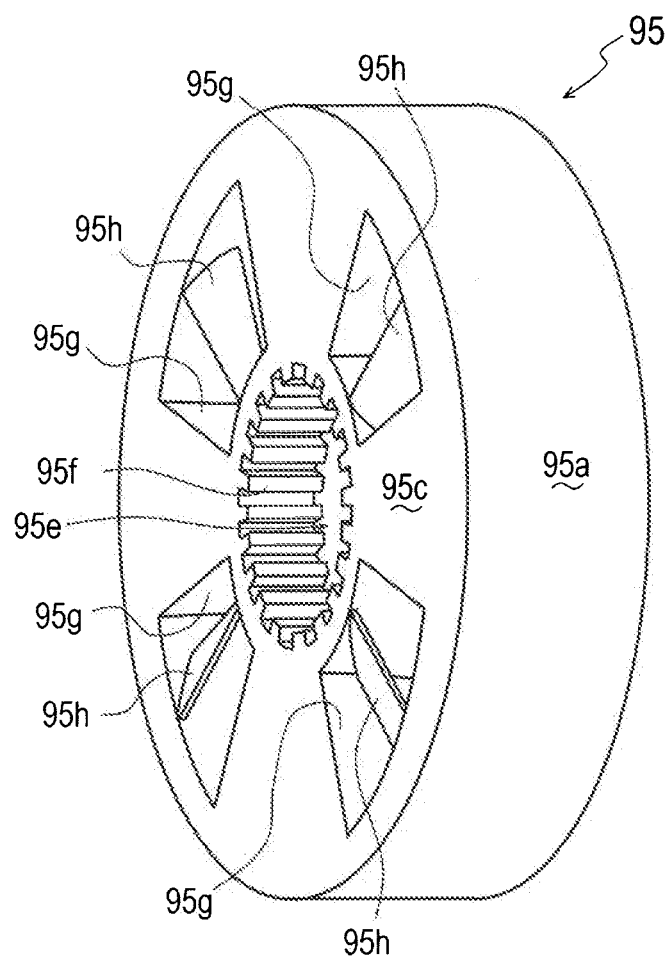
FIG. 10 is a perspective view of a reverse driven disc 95.
Figure 11:
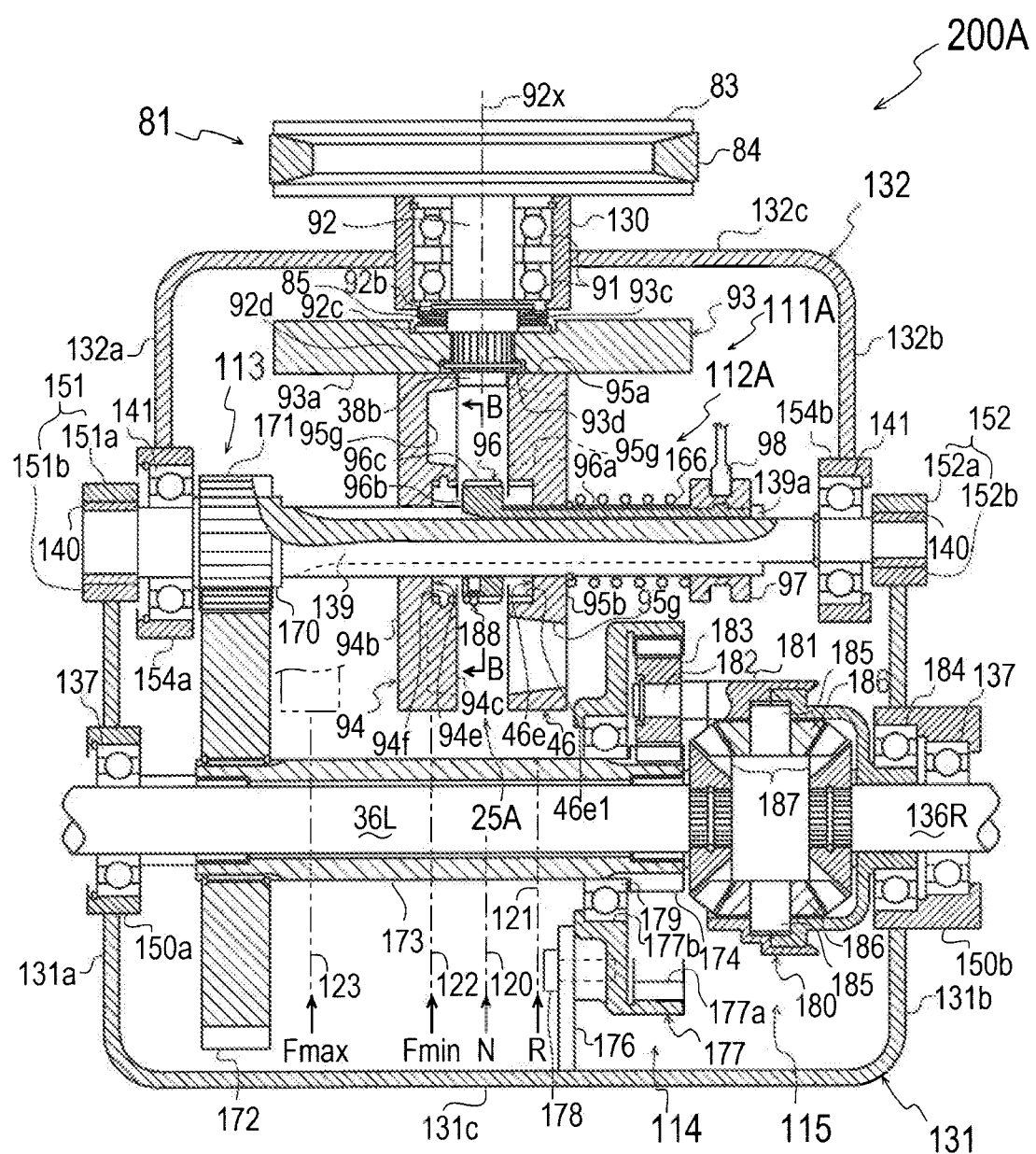
FIG. 11 is a sectional rear view of an alternative transaxle 200A serving as a modification of transaxle 200, showing a neutral state of transaxle 200A.
Figure 12:
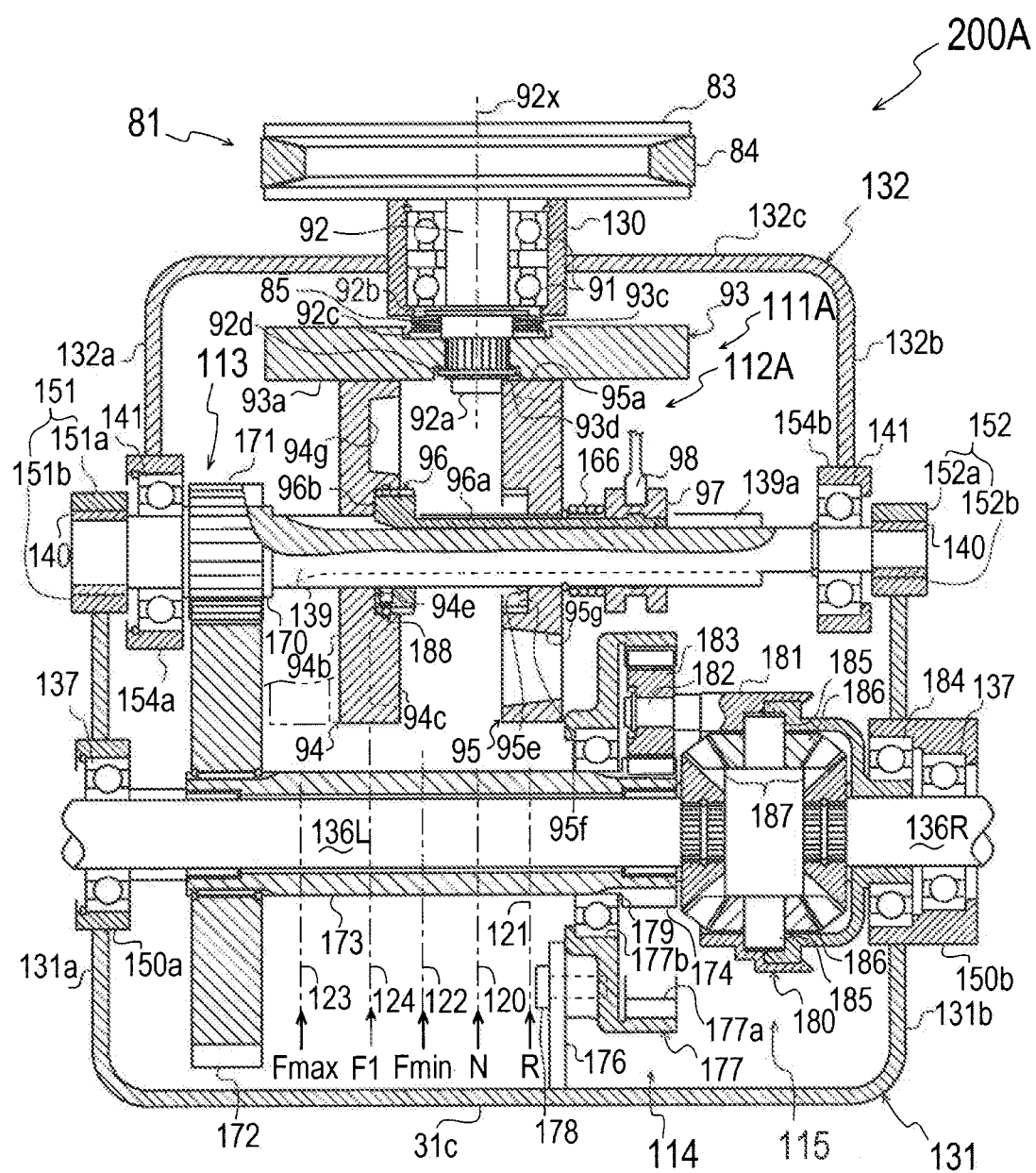
FIG. 12 is a sectional rear view of transaxle 200A, showing a minimum forward traveling speed state of transaxle 200A.

Referring to FIGS. 8 to 10, transaxle 200 will be described. Transaxle 200 includes a frictional transmission mechanism 111, a disc operation mechanism 112, a reduction gear train 113, a planetary reduction gear mechanism 114 and a differential mechanism 115. In transaxle 200, reduction gear train and mechanism 113 and 114 are interposed between frictional transmission mechanism 111 and differential mechanism 115 so as to transmit an output force of frictional transmission mechanism 111 to differential mechanism 115 in comparison with transaxle 2 in which frictional transmission mechanism 40 and differential mechanism 41 are combined with no reduction mechanism interposed therebetween and in which right and left reduction mechanisms 22 are interposed between the respective right and left output shafts of differential mechanism 41 (i.e., differential yoke shafts 52) and respective right and left axles 26.

Vehicle body frame 4 has a fixed bottom frame 131 and a movable top frame 132 between right and left side plates 4a and 4b. Bottom frame 131 is U-shaped in rear view of lawn mower 100 so as to have left and right vertical side plate portions 131a and 131b and a laterally horizontal bottom plate portion 131c extended between bottom ends of left and right side plate portions 131a and 131b. Left and right boss members 150a and 150b are fixed in respective side plate portions 131a and 131b and journal respective left and right differential yoke shafts 136L and 136R via respective bearings 137. Left and right differential yoke shafts 136L and 136R serve as output shafts of differential mechanism 115. Differential yoke shafts 136L and 136R may be drivingly connected to separate axles of drive wheels 5 or may be directly connected to drive wheels 5 so as to serve as axles themselves.

Left and right boss members 151 and 152 are fixed on upper edges of respective left and right side plate portions 131a and 131b of frame 131 and journal left and right end portions of a laterally horizontal transmission output shaft 139 via respective bushes 140. More specifically, as best understood from FIGS. 9 (a) and (b), boss member 151 is dividable into halves 151a and 151b, and boss member 152 into halves 152a and 152b. Halves 151b and 152b are previously fixed to upper edges 131d of respective left and right side plate portions 131a and 131b of bottom frame 131. Bushes 140 holding the right and left end portions of transmission output shaft 139 are put on halves 151b and 152b, and then halves 151a and 152a are fastened to respective halves 151b and 152b so as to cover respective bushes 140, thereby completing boss members 151 and 152 journaling transmission output shaft 139.

Movable top frame 132 is vertically reversed U-shaped in rear view of lawn mower 100 so as to have left and right vertical side plate portions 132a and 132b and a laterally horizontal top plate portion 132c extended between tops of left and right side plate portions 132a and 132b. Boss members 154a and 154b are fixed on lower edges of left and right side plate portions 132a and 132b and are disposed on immediately proximal sides of respective boss members 151 and 152 so as to journal right and left portions of transmission output shaft 139 via respective bearings 141. Each of boss members 154a and 154b may be dividable into halves for the convenience of journaling transmission output shaft 139 similar to boss members 151 and 152. Movable top frame 132 is rotatably centered on transmission output shaft 139 while fixed bottom frame 131 is fixed to vehicle body frame 4.

A vertical boss member 130 is fixed in top plate portion 132c of top frame 132 so as to project upward and downward from top plate portion 132c, and journals a vertical input shaft 92 of transaxle 200 (i.e., an input shaft of frictional transmission mechanism 111) via bearings 91. Input shaft 92 projects upward from boss member 130 so as to be fixedly provided thereon with driven pulley 83 of belt transmission 81 for transmitting power from engine 3 to input shaft 92.

Movable top frame 132, input shaft 92 and driven pulley 83 constitute clutch 110 of transaxle 200. Clutch 110 is a tension clutch for loosening belt 84 of belt transmission 81 to shut off transaxle 200 from power of engine 3. In this regard, as shown in FIGS. 9(a) and 9(b), a lower spring retainer 157 projects distally from side plate portion 131a (or 131b) of fixed bottom frame 131, and an upper spring retainer 158 from side plate portion 132a (or 132b) of movable top frame 132. A spring 159 is interposed between spring retainers 157 and 158 so as to bias movable top frame 132 toward a clutch-on position where an axis 92x of input shaft 92 is oriented in a vertical direction 162 as shown in FIG. 9(a). A tab 132d projects from movable top frame 132 and is operatively connected to clutch pedal 101 via a link 161 such as a wire or a cable. When clutch pedal 101 is depressed, depressed clutch pedal 101 pulls link 161 against spring 159 so as to rotate movable top frame 132 to a clutch-off position where axis 92x of input shaft 92 is oriented in a slant direction 163 having an angle from vertical direction 162 as shown in FIG. 9(b). Therefore, when movable top frame 132 is set at the clutch-off position, driven pulley 83 is tilted to loosen belt 84 so as to isolate transaxle 200 from the rotation of engine output shaft 3a.

A stopper pin 160 projects from side plate portion 132a (or 132b) of movable top frame 132 adjacent to boss member 154a (or 154b). When depressed clutch pedal 101 is released, movable top frame 132 returns to the clutch-on position by the biasing force of spring 159. Finally, stopper pin 160 comes to abut against upper edge 131d of side plate portion 131a (or 131b) so as to locate movable top frame 132 at the clutch-on position where axis 92x of input shaft 92 is oriented in vertical direction 162 and so as to prevent movable top frame 132 at the clutch-on position from being further rotated by spring 159.

On an assumption that axis 92x of input shaft 92 is oriented in vertical direction 162, frictional transmission mechanism 111 includes a horizontal drive disc 93, a vertical normal driven disc 94, a vertical reverse driven disc 95 and disc operation mechanism 113. Drive disc 93 is spline-fitted on a lower portion of input shaft 92 so as to be rotatably integral with input shaft 92 and so as to be slidable on input shaft 92 along axis 92x. On an assumption that axis 92x is extended downward from input shaft 92, driven discs 94 and 95 are juxtaposed left and right so as to have axis 92x therebetween. Driven discs 94 and 95 have respective central holes through which transmission output shaft 139 is passed rotatably relative to driven discs 94 and 95. A horizontal lower surface of drive disc 93 serves as a disc surface 93a, and peripheral edges of respective driven discs 94 and 95 serve as disc edges 94a and 95a frictionally abutting at tops thereof against disc surface 93a of drive disc 93. When drive disc 93 rotates, normal and reverse driven discs 94 and 95 rotate in opposite directions according to the rotation of drive disc 93, i.e., normal driven disc 94 rotates in a normal direction for rotating differential yoke shafts 136L and 136R in a forward traveling direction, and reverse driven disc 95 rotates in a reverse direction for rotating differential yoke shafts 136L and 136R in a backward traveling direction.

Drive disc 93 has a recess 93c open upward on a top surface thereof and has a recess 93d open downward on disc surface 93a. Retaining rings 92b and 92d are fixed on input shaft 92 and a washer 92c is fitted on input shaft 92. Retaining ring 92b is disposed at the bottom end of boss member 130. Washer 92c is disposed in recess 93c of drive disc 93 so as to abut against a bottom surface of recess 93c. Spring 85 is compressed around input shaft 92 between retaining ring 92b and washer 92c so as to bias drive disc 93 downward. Retaining ring 92d is disposed in recess 93d of drive disc 93 so as to prevent drive disc 93 from falling. Therefore, drive disc 93 is frictionally pressed at disc surface 93a against the tops of disc edges 94a and 95a of driven discs 94 and 95.

Disc operation mechanism 113 includes a shifter 96, a fork ring 97, a fork 98 and a fork shaft 99. As shown in FIGS. 9(a) and 9(b), fork shaft 99 is laterally horizontally extended and is axially slidably supported by upper portions of side plate portions 131a and 131b of fixed bottom frame 131. Fork shaft 99 is operatively connected to speed control lever 10. Shifter 96 has a ring-shaped clutch portion 96b and is formed with spline keys 96a axially extended from clutch portion 96b. Transmission output shaft 139 is formed with axially extended key grooves 139a (see FIG. 8 with reference to FIG. 13) on the outer peripheral surface thereof. Spline keys 96a are fitted into respective key grooves 139a and clutch portion 96b is fitted at the inner peripheral surface on the outer peripheral surface of transmission output shaft 139. A fork ring 97 is fixed to axial ends of spline keys 96a so as to be fitted on the outer peripheral surface of transmission output shaft 139 axially slidably on transmission output shaft 139. Therefore, shifter 96 and fork ring 97 are rotatably integral with transmission output shaft 139 and are axially slidable on transmission output shaft 139. Fork ring 97 is disposed between reverse driven disc 95 and boss member 154b. Fork 98 is engaged into an annular groove of fork ring 97 and is fixed onto fork shaft 99.

Normal driven disc 94 has a vertical distal side surface 94b and a vertical proximal side surface 94c opposite to distal side surface 94*b*. Reverse driven disc 95 has a vertical distal side surface 95*b* and a vertical proximal side surface 95*c* opposite to distal side surface 95*b*. Proximal side surfaces 94*c* and 95*c* of respective driven discs 94 and 95 face each other. A bottom end portion 92*a* of input shaft 92 projects downward from disc surface 93*a* of drive disc 93 between top portions of proximal side surfaces 94*c* and 95*c*.

A compressed spring 166 is wound around transmission output shaft 139 between distal side surface 95*b* of driven disc 95 and fork ring 97 so as to bias reverse driven disc 95 toward normal driven disc 94. On the other hand, a spring retaining ring 170 is fixed on transmission output shaft 139 and a compressed spring 167 is wound around transmission output shaft 139 between spring retaining ring 170 and distal side surface 94*b* of normal driven disc 94 so as to bias normal driven disc 94 toward reverse driven disc 95. More specifically, an axially distal end of the central hole of normal driven disc 94 is radially expanded so as to be formed as a recess 94*d* open on distal side surface 94*b*, and a spring retaining ring 169 is fitted on transmission output shaft 139 in recess 94*d* so as to abut against an end of spring 167. In this way, distal side surface 94*b* of normal driven disc 94 does not directly abut against spring 167, thereby being prevented from being damaged by spring 167.

Clutch portion 96*b* of shifter 96 is formed on an outer peripheral surface thereof with dog clutch teeth 96*c*. As shown in FIG. 10, representative reverse driven disc 95 has a clutch recess 95*e* open on proximal side surface 95*c*. In other words, the axially proximal end portion of the central hole of reverse driven disc 95 for passing transmission output shaft 139 therethrough is expanded radially to be open on proximal side surface 95*c* so as to serve as clutch recess 95*e*. Reverse driven disc 95 is formed with dog clutch teeth 95*f* on an inner peripheral edge thereof defining clutch recess 95*e* so as to correspond to dog clutch teeth 96*c* on clutch portion 96*b* of shifter 96. Similarly, the axially proximal end portion of the central hole of normal driven disc 94 is expanded radially to open on proximal side surface 94*c* so as to serve as a clutch recess 94*e* formed with dog clutch teeth 94*f* corresponding to dog clutch teeth 96*c* of clutch portion 96*b* of shifter 96. In this way, dog clutch teeth 96*c* on clutch portion 96*b* and dog clutch teeth 94*f* or 95*f* in each of clutch recesses 94*e* and 95*e* constitute a dog clutch.

FIG. 8 shows a neutral position 120 of clutch portion 96*b* where clutch portion 96*b* is disposed between proximal side surfaces 94*c* and 95*c* of normal and reverse driven discs 94 and 95 so that dog clutch teeth 96*c* disengage from dog clutch teeth 94*f* and 95*f* of normal and reverse driven discs 94 and 95. In other words, when clutch portion 96*b* is disposed at neutral position 120, normal and reverse driven discs 94 and 95 are free from shifter 96 so that neither the normal-directed rotation (simply referred to as normal rotation) of normal driven disc 94 nor the reverse-directed rotation (simply referred to as reverse rotation) of reverse driven disc 95 is transmitted to transmission output shaft 139.

When clutch portion 96*b* is disposed at neutral position 120, reverse driven disc 95 biased by spring 166 toward normal driven disc 94 abuts at the top portion of proximal side surface 95*c* against bottom end portion 92*a* of input shaft 92 so as to be prevented from further moving toward normal driven disc 94. This position of reverse driven disc 95 is defined as a backward traveling position 121. When input shaft 92 and drive disc 93 rotate and reverse driven disc 95 is disposed at backward traveling position 121, reverse driven disc 95 that frictionally abuts at disc edge 95*a* against disc surface 93*a* of drive disc 93 rotates in the reverse direction at a constant speed relative to drive disc 93. In this regard, the axial position of reverse driven disc 95 along transmission output shaft 139 is fixed at backward traveling position 121 regardless of change of the axial position of shifter 96 because spring 166 biases reverse driven disc 95 toward normal driven disc 94 and shifter 96 is not configured to move reverse driven disc 95 away from normal driven disc 94 (toward boss member 154*b*) even when clutch portion 96*b* is engaged in clutch recess 95*e*. In other words, the rotary speed of reverse driven disc 95 relative to drive disc 93 for backward traveling of lawn mower 100 is constant. Therefore, whether or not transmission output shaft 139 and differential yoke shafts 136L and 136R rotate in the backward traveling direction depends on whether or not clutch portion 96*b* enters clutch recess 95*e* to mesh dog clutch teeth 96*c* with dog clutch teeth 95*f*.

On the other hand, when clutch portion 96*b* is disposed at neutral position 120, normal driven disc 94 biased by spring 167 toward reverse driven disc 95 abuts at the top portion of proximal side surface 94*c* against bottom end portion 92*a* of input shaft 92 so as to be prevented from further moving toward reverse driven disc 95. This position of normal driven disc 94 is defined as a minimum forward traveling speed position 122. When input shaft 92 and drive disc 93 rotate and normal driven disc 94 is disposed at minimum forward traveling speed position 122, normal driven disc 94 that frictionally abuts at disc edge 94*a* against disc surface 93*a* of drive disc 93 rotates in the normal direction at the minimum speed thereof relative to drive disc 93.

When clutch portion 96*b* of shifter 96 enters clutch recess 94*e* of normal driven disc 94 at minimum forward traveling speed position 122 so as to mesh dog clutch teeth 96*c* with dog clutch teeth 94*f*, shifter 96 is axially slidable to move normal driven disc 94 engaging with clutch portion 96*b* from minimum forward traveling speed position 122 to a maximum forward traveling speed position 123. As normal driven disc 94 engaging with clutch portion 96*b* of shifter 96 moves toward maximum forward traveling speed position 123, the frictional abutting position of disc edge 54*a* against disc surface 53*a* moves away from axis 92*x* serving as the rotary axis of drive disc 93 against spring 167 so as to increase the rotary speed of normal driven disc 94 relative to drive disc 93. Finally, when normal driven disc 94 reaches maximum forward traveling speed position 123, normal driven disc 94 rotates in the normal direction at the maximum speed. As shifter 96 slides on transmission output shaft 139 to move clutch portion 96*b* toward reverse driven disc 95, normal driven disc 94 having been disposed at maximum forward traveling speed position 123 slides together with shifter 96 toward minimum forward traveling speed position 122 because of the biasing force of spring 167. During this slide, dog clutch teeth 94*f* of normal driven disc 94 keep their engagement with dog clutch teeth 96*c* of clutch portion 96*b*, thereby reducing the rotary speed of normal driven disc 94 relative to drive disc 93. In this way, spring 167 functions to return normal driven disc 94 to minimum forward traveling speed position 122.

Speed control lever 10 is provided with a neutral position N, a backward traveling position R, a minimum forward traveling speed position Fmin and a maximum forward traveling speed position Fmax, and has a movable range between minimum forward traveling speed position Fmin and maximum forward traveling speed position Fmax for changing the rotary speed of normal driven disc 94 relative to drive disc 93. When speed control lever 10 is set at neutral position N, shifter 96 is set to locate clutch portion 96*b* at neutral position 120 so that normal driven disc 94 is disposed at minimum forward traveling speed position 122 and reverse driven disc 95 is disposed at backward traveling position 121 as mentioned above. Backward traveling position R of speed control lever 10 corresponds to the position of clutch portion 96b of shifter 96 engaged in clutch recess 95e of reverse driven disc 95 at backward traveling position 121. Minimum forward traveling speed position Fmin of speed control lever 10 corresponds to the position of clutch portion 96b engaged in clutch recess 94e of normal driven disc 94 at minimum forward traveling speed position 122. Maximum forward traveling speed position Fmax of speed control lever 10 corresponds to the position of clutch portion 96b engaged in clutch recess 94e of normal driven disc 94 at maximum forward traveling speed position 123. As speed control lever 10 is moved in the movable range between minimum forward traveling speed position Fmin and maximum forward traveling speed position Fmax, normal driven disc 94 engaging with clutch portion 96b moves between minimum forward traveling speed position 122 and maximum forward traveling speed position 123.

To change the traveling direction of lawn mower 100, clutch pedal 101 is cooperated with speed control lever 10. In this regard, when speed control lever 10 is shifted between minimum forward traveling speed position Fmin and backward traveling position R, speed control lever 10 must pass neutral position N. When speed control lever 10 is located at neutral position N, clutch portion 96b of shifter 96 is disposed at neutral position 120 so as to disengage from both driven discs 94 and 95, thereby isolating transmission output shaft 139 from the rotations of both discs 94 and 95. However, as long as the tops of disc edges 94a and 95a of driven discs 94 and 95 abut against disc surface 93a of drive disc 93, normal driven disc 94 rotates in the normal direction and reverse driven disc 95 rotates in the reverse direction. During rotation of drive disc 93, transmission output shaft 139 may rotate suddenly to cause a starting shock of lawn mower 100 as soon as clutch portion 96b of shifter 96 is engaged into clutch recess 94e or 95e of driven disc 94 or 95. Therefore, when speed control lever 10 is located at neutral position N, clutch pedal 101 is depressed so as to disengage clutch 110, i.e., so as to loosen belt 84 of belt transmission 81, thereby shutting off input shaft 92 of transaxle 200 from the rotation of engine output shaft 3a. Therefore, after drive disc 93 is stopped, speed control lever 10 having been set at neutral position N is shifted to minimum forward traveling speed position Fmin or backward traveling position R, thereby preventing transmission output shaft 139 from being suddenly rotated when clutch portion 96b is engaged into clutch recess 94e or 95e. Then, clutch pedal 101 is released to engage clutch 110, i.e., to tense belt 84 on driven pulley 83, so as to start rotation of drive disc 93 and driven disc 94 and 95, thereby starting lawn mower 100 to travel forward or backward.

As mentioned above, due to operation of clutch pedal 101 for stopping input shaft 92, driven discs 94 and 95 must be free from the driving power of engine 3 before shifter 96 engages with either driven disc 94 or 95 to drivingly connect driven disc 94 or 95 to transmission output shaft 139, thereby reducing heat and damage caused on disc surface 93a and disc edges 94a and 95a frictionally contacting each other when clutch portion 96b is engaged into clutch recess 94e or 95e, and thereby enhancing durability of discs 93, 94 and 95.

Further, as shown in FIG. 8, normal driven disc 94 is formed with recesses 94g open on proximal side surface 94c so as to increase the surface area of normal driven disc 94, whereby rotating normal driven disc 94 is efficiently cooled. Further, air is resisted in recesses 94g so as to cause a wind, and this wind is partly blown to reverse driven disc 95. As shown in FIG. 10, reverse driven disc 95 has vents 95g with vanes 95h. Vents 95g are formed radially with respect to the central hole of disc 95 and are aligned in the peripheral direction of disc 95. Each vent 95g axially penetrates disc 95 between distal and proximal side surfaces 95b and 95c. Therefore, during rotation of reverse driven disc 95, cooling wind is passed through vents 95g from either side surface 95b or 95c to the other side surface 95b or 95c, thereby efficiently cooling entire frictional transmission mechanism 111 in cooperation with recesses 94g of normal driven disc 94. Especially, in comparison with axially movable normal driven disc 94, axially immovable reverse driven disc 95 stabilizes the effect of cooling wind through vents 95g. Vanes 95h are formed in respective vents 95g so as to be slant in the peripheral direction of disc 95. Alternatively, vanes may be formed on any portion of reverse driven disc 95, e.g., distal or proximal side surface 95b or 95c. Further, any design of driven discs 94 and 95 for causing an air flow to cool driven discs 94 and 95 is adaptable. In this way, drive discs 94 and 95 are formed to enhance their cooling effect, thereby further enhancing the durability thereof.

A cylindrical intermediate shaft 173 is fitted on one of right and left differential yoke shafts 136L and 136R (in this embodiment, left differential yoke shaft 136L) so as to rotatable relative to differential yoke shaft 136L. Reduction gear train 113 is interposed between transmission output shaft 139 and intermediate shaft 173. Planetary reduction gear mechanism 114 is interposed between intermediate shaft 173 and a differential casing 180 of differential mechanism 115. Differential mechanism 115 is adjacent to one of left and right side plate portions 131a and 131b of bottom frame 131 (in this embodiment, side plate portion 131b). Reduction gear train 113 is adjacent to the other of left and right side plate portions 131a and 131b (in this embodiment, side plate portion 131a). Planetary reduction gear mechanism 114 is adjacent to differential mechanism 115 adjacent to side plate portion 131b so that differential mechanism 115 is disposed between planetary reduction gear mechanism 114 and side plate portion 131b.

Reduction gear train 113 includes a small diameter spur gear 171 and a large diameter spur gear 172 directly meshing with each other. Small diameter spur gear 171 is fixed on transmission output shaft 139, and large diameter gear 172 is fixed on an axial end portion of intermediate shaft 173.

Planetary reduction gear mechanism 114 includes a sun gear 174, an internal gear member 177 and at least one planetary gear 183. Sun gear 174 is formed (alternatively, may be fixed) on the other axial end portion of cylindrical intermediate shaft 173 opposite to gear 172 of reduction gear train 113. Internal gear member 177 is fastened to a stay 176 formed on bottom plate portion 131c of frame 131 by a bolt 178. Internal gear member 177 journals intermediate shaft 173 via a bearing 179. An internal gear 177a is formed on an inner peripheral surface of internal gear member 177. A planetary gear carrier 181 is a part of differential casing 180 of differential mechanism 115. At least one planetary gear 183 is pivotally supported on at least one pivot shaft 182 projecting from planetary gear carrier 181 parallel to intermediate shaft 173, and is disposed between sun gear 174 and internal gear 177a so as to mesh with sun gear 174 and internal gear 177a. When sun gear 174 is rotated together with intermediate shaft 173 by transmission output shaft 139 via reduction gear train 113, planetary gear 183 revolves centered on sun gear 174 so as to rotate differential casing 180 serving as an input member of differential mechanism 115.

Differential mechanism 115 includes differential casing 180, a pair of differential pinions 186 and right and left differential side gears 187. Differential casing 180 supports the pair of differential pinions 186 symmetrically at one of left and right end portions thereof via respective coaxial pinion shafts 185 extended perpendicular to differential yoke shafts 136L and 136R. Differential casing 180 is formed on the other of left and right end portions thereof with a boss journalled via a bearing 184 by side plate portion 131b adjacent to differential mechanism 115. Differential yoke shaft 136R journalled by boss member 150b via bearing 137 is passed through the boss of differential casing 180, and differential yoke shaft 136L journalled by boss member 150a via other bearing 137 is passed through intermediate shaft 173. A proximal end of differential yoke shaft 136R projects from the boss of differential casing 180 and a proximal end of differential yoke shaft 136L projects from intermediate shaft 173 so as to face the proximal end of differential yoke shaft 136R. Left and right differential side gears 187 are fixed on the proximal ends of respective differential yoke shafts 136L and 136R so that each of differential pinions 186 meshes with both left and right differential side gears 187. Incidentally, in this description of differential mechanism 115 eccentric to the lateral middle of transaxle 200, the "proximal" end of each differential yoke shaft 136L and 136R means an end thereof adjacent to the lateral middle of differential mechanism 115 defining axes of differential pinions 186.

An alternative transaxle 200A will be described with reference to FIGS. 11 to 15. Transaxle 200A is the same as transaxle 200 except for modified normal driven disc 94 and shifter 96. The reference numerals used in the embodiment of FIGS. 7 to 10 are used to designate members and parts that have the same functions as those in the embodiment of FIGS. 7 to 10 designated by the same reference numerals.

Figure 13:
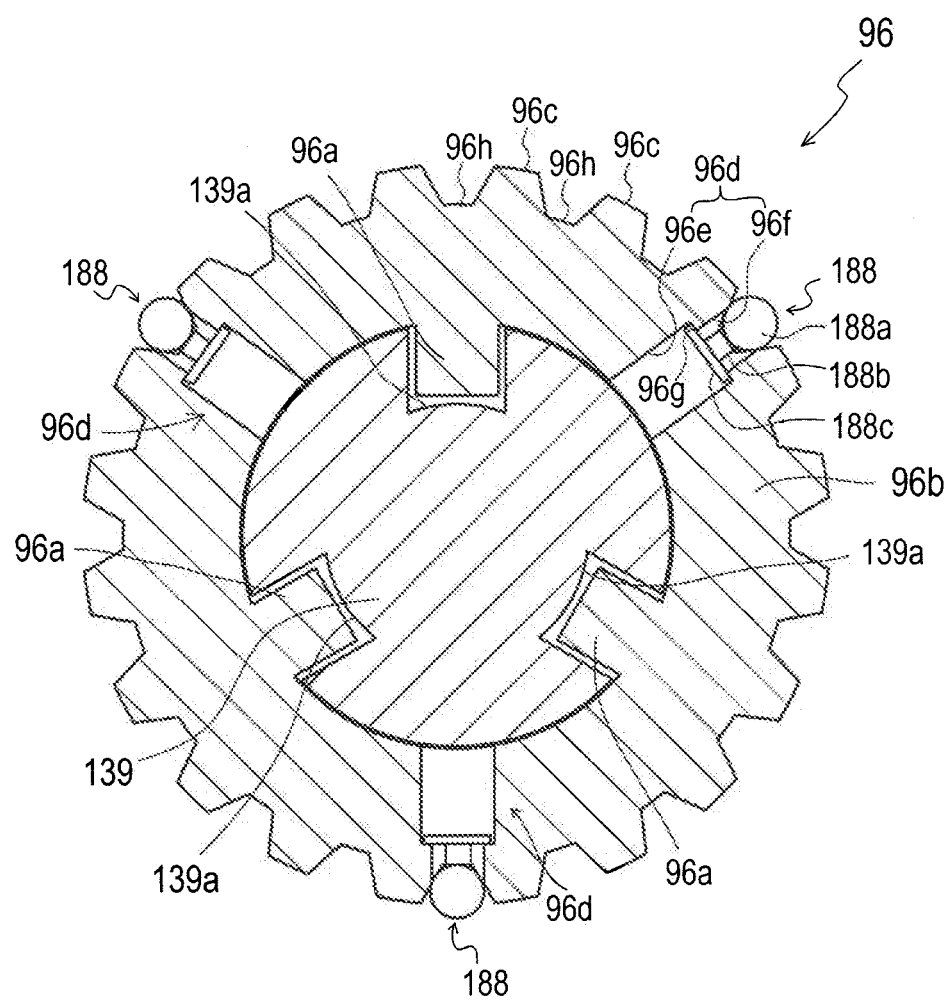
FIG. 13 is a sectional view of a clutch portion 96b of a shifter 96 on a transmission output shaft 139 when taken in B-B lines of FIG. 10.

As shown in FIG. 13, shifter 96 used in transaxle 200A is provided with one or more detent members 188 (in this embodiment, three detent members 188) in clutch portion 96b. Detent member 188 is formed with a detent ball 188a, a retaining plate 188c and a joint pin 188b joining detent ball 188a to retaining plate 188c. In this regard, clutch portion 96b of shifter 96 is bored through by radial holes 96d between the inner and outer peripheral edges thereof. Each of radial holes 96d includes an inner hole portion 96e open at the inner peripheral edge of clutch portion 96b and includes an outer hole portion 96f open at the outer peripheral edge between the dog clutch teeth 96c. Inner hole portion 96e is diametrically larger than outer hole portion 96f so that radial hole 96d has a step 96g between inner and outer hole portions 96e and 96f.

Retaining plate 188c is disposed in inner hole portion 96e. Retaining plate 188c is diametrically larger than outer hole portion 96f so that step 96g of radial hole 96d between inner and outer hole portions 96e and 96f prevents retaining plate 188c from entering outer hole portion 96f. Joint pin 188b is extended radially outward with respect to transmission output shaft 139 so as to be joined at an end thereof to retaining plate 188c and at another end thereof to detent ball 188a, thereby locating detent ball 188a outward from retaining plate 188c in the radial direction with respect to transmission output shaft 139. Detent ball 188a is diametrically smaller than outer hole portion 96f so that detent ball 188a can be withdrawn into outer hole portion 96f.

Figure 14:
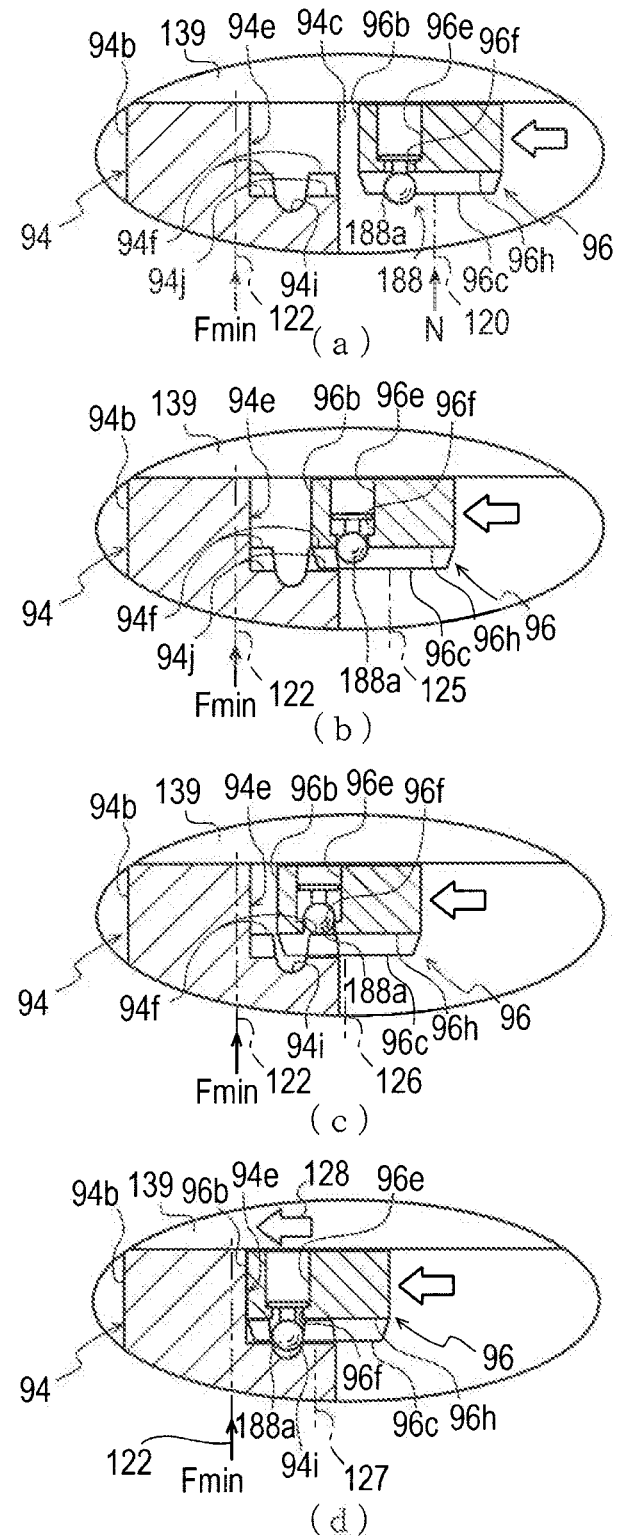
FIGS. 14(a) to 14(d) are fragmentary sectional views of normal driven disc 94 and clutch portion 96b when normal driven disc 94 is located at a minimum forward traveling speed position 122.
Figure 15:
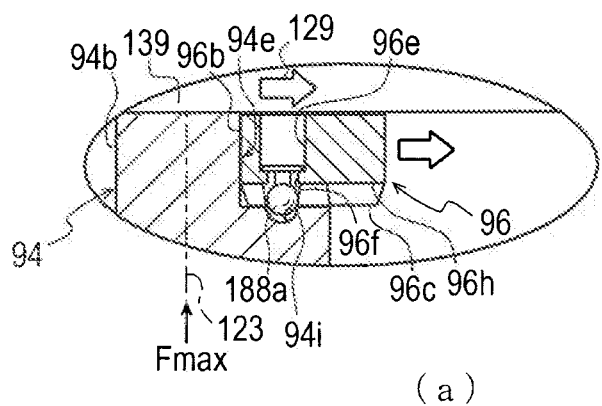
FIGS. 15(a) to 15(c) are fragmentary sectional views of normal driven disc 94 and clutch portion 96b.
Figure 15:
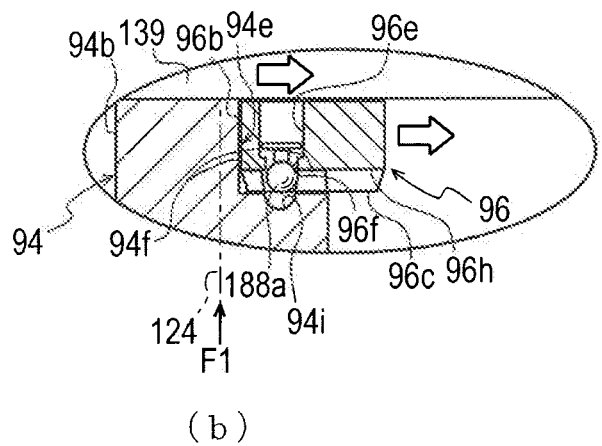
Figure 15:
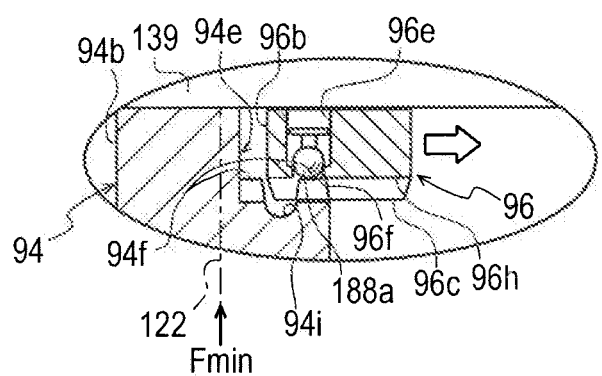

Clutch portion 96b has grooves 96h defined among dog clutch teeth 96c so as to correspond to respective dog clutch teeth 94f and 95f. Conversely, as shown in FIGS. 14 and 15, representative normal driven disc 94 has grooves 94j defined among dog clutch teeth 94f in clutch recess 94e so as to correspond to respective dog clutch teeth 96c of clutch portion 96b. Of course, reverse driven disc 95 also has grooves defined between dog clutch teeth 95f so as to correspond to respective dog clutch teeth 96c of clutch portion 96b. Some of grooves 96h (in this embodiment, three grooves 96h) of clutch portion 96b are selected to have respective openings defining the openings of outer hole portions 96f at the outer peripheral edge of clutch portion 96b. Normal driven disc 94 is formed with detent recesses 94i on all dog clutch teeth 94f in clutch recess 94e so that any three of detent recesses 94i can receive detent balls 188a of detent members 188. Detent recesses 94i are disposed on dog clutch teeth 94f at a certain position in the axial direction of normal driven disc 94 so as to define the axial position of clutch portion 96b of shifter 96 in clutch recess 94e relative to normal driven disc 94. By engaging detent balls 188a into respective detent recesses 94i, clutch portion 96b of shifter 96 is prevented from axially moving relative to normal driven disc 94.

Due to such a detent structure, normal driven disc 94 does not need a spring (such as spring 167 in transaxle 200) wound around transmission output shaft 139 to bias normal driven disc 94 toward reverse driven disc 95. Therefore, transmission output shaft 139 can be shortened so as to laterally minimize transaxle 200A because transmission output shaft 139 does not have a length for ensuring a range for compressing or expanding the spring. Further, distal side surface 94b can be simply plain because it does not have a recess (such as recess 94d) for accommodating a spring retainer (such as spring retaining ring 169) receiving the spring.

Further, detent member 188 uses a centrifugal force of rotating transmission output shaft 139 so as to press retaining plate 188c against step 96g of radial hole 96d and so as to thrust detent ball 188a outward from the opening of outer hole portion 96f in groove 96h. Therefore, each of detent members 188 is provided with no spring that should be usually provided in inner hole portion 96e to centrifugally bias detent member 188, thereby reducing the number of parts. Any number and positions of detent members 188 in clutch portion 96b may be designed. Preferably, they are designed so that at least any one of detent members 188 must have detent ball 188a lower than retaining plate 188c so as to naturally thrust detent ball 188a outward from outer hole portion 96f regardless of wherever clutch portion 96b is disposed in its rotational direction. In this way, transaxle 201 is advantageous for reducing the size and costs of lawn mower 100.

Referring to FIGS. 14 and 15, movement of clutch portion 96b provided with detent members 188 to engage with normal driven disc 94 and to disengage from normal driven disc 94 will be described. FIG. 14(a) shows clutch portion 96b disposed at neutral position 120 and normal driven disc 94 at minimum forward traveling speed position 122 when speed control lever 10 is disposed at neutral position N. In this state, as mentioned above in description of transaxle 200, clutch pedal 101 is depressed so as to disengage clutch 110 to isolate input shaft 92 from power of engine 3 before speed control lever 10 is moved from neutral position N. At least one detent ball 188a coming at a bottom of clutch portion 96b is disposed outward from radial hole 96d (outer hole portion 96f) by its gravity. Hereinafter, this detent ball 188a is referred to as at least one detent ball 188a.

By moving speed control lever 10 from neutral position N toward minimum forward traveling speed position Fmin, clutch portion 96b moves from neutral position 120 to a position 125 shown in FIG. 14(b). When clutch portion 96b reaches position 125, clutch portion 96b starts entering clutch recess 94e so that dog clutch teeth 96c start being inserted into grooves 94j among dog clutch teeth 94f. Whereby dog clutch teeth 94f of normal driven disc 94 starts being inserted into grooves 96h among dog clutch teeth 96c and some dog clutch teeth 94f come to contact at least one detent ball 188a. Afterward, shifter 96 is further moved to increase the engagement depth of clutch portion 96b into clutch recess 94e. When clutch portion 96b is disposed at a position 126 as shown in FIG. 14(c), at least one detent ball 188a is pressed by clutch teeth 94f so as to be withdrawn in radial hole 96d (outer hole portion 96f, thereby allowing the slide of clutch portion 96b in clutch recess 94e.

When speed control lever 10 reaches minimum forward traveling speed position Fmin, clutch portion 96b reaches a position 127 shown in FIG. 14(d) so that at least one detent ball 188a falls into detent recesses 94i. Whereby clutch portion 96b is completely engaged with normal driven disc 94 so as to be prevented from moving relative to normal driven disc 94. This position 127 of clutch portion 96b to be completely engaged to normal driven disc 94 is defined so as to hold normal driven disc 94 at minimum forward traveling speed position 122. Then, clutch pedal 101 is released to re-engage clutch 110 so as to rotate normal driven disc 94 together with shifter 96 and transmission output shaft 139, thereby causing the centrifugal force of transmission output shaft 139 to so as to thrust all detent balls 188a into detent recesses 94i.

Afterward, when speed control lever 10 is moved from minimum forward traveling speed position Fmin toward maximum forward traveling speed position Fmax, clutch portion 96b moves as directed by an arrow 128 in FIG. 14(d) so that normal driven disc 94 moves together with clutch portion 96b from minimum forward speed traveling speed position 122 toward maximum forward traveling speed position 123. As normal driven disc 94 approaches maximum forward traveling speed position 123, the engagement force of detent balls 188a into detent recesses 54i increases because the rotary speed of normal driven disc 94 increases to increase the centrifugal force of rotating transmission output shaft 139.

After speed control lever 10 reaches maximum forward traveling position Fmax, when speed control lever 10 moves toward neutral position N, shifter 96 moves so as to move clutch portion 96b together with normal driven disc 94 as directed by an arrow 129 in FIG. 15(a). During this movement of clutch portion 96b, normal driven disc 94 rotates to ensure the centrifugal force to thrust detent balls 188a into detent recesses 94i. However, as shifter 96 moves in direction designated by arrow 129, the rotary speed of normal driven disc 94 is reduced so as to reduce the centrifugal force applied to detent members 188.

When normal driven disc 94 engaging with clutch portion 96b reaches a position 124 as shown in FIG. 15(b), reduced forward traveling speed becomes a speed F1 so that the reduced centrifugal force starts lacking to support detent balls 188a in detent recesses 94i. Whereby detent balls 188a become liable to be withdrawn into radial holes 96d (outer hole portion 96f). When speed control lever 10 reaches minimum forward traveling speed position Fmin so that normal driven disc 94 reaches minimum forward traveling speed position 122 as shown in FIG. 15(c), the top portion of proximal side surface 94c of normal driven disc 94 comes to abut against bottom end portion 92a of input shaft 92 so as to be prevented from further following the movement of clutch portion 96b toward neutral position 120. When speed control lever 10 moves from minimum forward traveling speed position Fmin to neutral position N, clutch portion 96b moves to neutral position 120 leaving normal driven disc 94 at minimum forward traveling speed position 122 so that detent balls 188a are released from detent recesses 94i so as to be withdrawn into radial holes 94d, thereby allowing the movement of clutch portion 96b relative to normal driven disc 94. Finally, clutch portion 96b is released from clutch recess 94e and reaches neutral position 120 when speed control lever 10 reaches neutral position N.

What is claimed is:

1. A transaxle comprising:
   a transmission differential unit including a frictional transmission mechanism and a differential mechanism,
   wherein the frictional transmission mechanism includes:
   an input shaft;
   a drive disc provided on the input shaft; and
   a driven disc whose outer peripheral edge frictionally contacts a disc surface of the drive disc,
   wherein the differential mechanism includes:
   a pair of coaxial output shafts; and
   a differential casing differentially connecting the output shafts to each other, and
   wherein the driven disc is ring-shaped and is fitted at an inner peripheral portion thereof on an outer peripheral portion of the differential casing so as to be unrotatable relative to the differential casing and so as to be slidable on the outer peripheral portion of the differential casing in the axial direction of the output shafts.

2. The transaxle according to claim 1, further comprising:
   a pair of axles; and
   a pair of reduction mechanisms interposed between the respective output shafts and the respective axles.

3. The transaxle according to claim 2, wherein the axles are disposed coaxially to the respective output shafts.

4. The transaxle according to claim 3, further comprising:
   a single housing incorporating the transmission differential unit and the reduction mechanisms.

5. The transaxle according to claim 3, further comprising:
   a first casing incorporating the transmission differential unit; and
   a pair of second casings incorporating the respective reduction mechanisms.

6. The transaxle according to claim 2, wherein the axles are disposed eccentrically to the respective output shafts.

7. The transaxle according to claim 6, further comprising:
   a single housing incorporating the transmission differential unit and the reduction mechanisms.

8. The transaxle according to claim 6, further comprising:
   a first casing incorporating the transmission differential unit; and
   a pair of second casings incorporating the respective reduction mechanisms.

9. The transaxle according to claim 1, wherein the drive disc is provided at a rotary central portion thereof with a region where the peripheral edge of the driven disc does not contact the disc surface of the drive disc.

* * * * *